United States Patent
Shikimachi

(10) Patent No.: US 10,984,551 B2
(45) Date of Patent: Apr. 20, 2021

(54) TRAVELING POSITION DETECTION APPARATUS AND TRAVELING POSITION DETECTION METHOD

(71) Applicant: DENSO CORPORATION, Kariya (JP)

(72) Inventor: Takeshi Shikimachi, Kariya (JP)

(73) Assignee: DENSO CORPORATION, Kariya (JP)

( * ) Notice: Subject to any disclaimer, the term of this patent is extended or adjusted under 35 U.S.C. 154(b) by 175 days.

(21) Appl. No.: 16/082,290

(22) PCT Filed: Feb. 13, 2017

(86) PCT No.: PCT/JP2017/005059
§ 371 (c)(1),
(2) Date: Sep. 5, 2018

(87) PCT Pub. No.: WO2017/154464
PCT Pub. Date: Sep. 14, 2017

(65) Prior Publication Data
US 2019/0035110 A1 Jan. 31, 2019

(30) Foreign Application Priority Data
Mar. 7, 2016 (JP) .............................. 2016-043963
Dec. 23, 2016 (JP) ............................ JP2016-250222

(51) Int. Cl.
*G06K 9/00* (2006.01)
*G01C 21/36* (2006.01)
*G06T 7/73* (2017.01)

(52) U.S. Cl.
CPC ............ *G06T 7/74* (2017.01); *G01C 21/3626* (2013.01); *G06K 9/00798* (2013.01); *G06T 2207/30256* (2013.01)

(58) Field of Classification Search
CPC .......... G06K 9/00798; G06K 9/00818; G01C 21/3658; G01C 21/3626; G06T 2207/30256; G06T 7/74
See application file for complete search history.

(56) References Cited

U.S. PATENT DOCUMENTS

2007/0078594 A1* 4/2007 Mori ...................... G01C 21/12
701/408
2008/0208460 A1* 8/2008 Nakao ................ G01C 21/3602
701/532

(Continued)

FOREIGN PATENT DOCUMENTS

| JP | H10040379 A | 2/1998 |
|----|-------------|--------|
| JP | 2001250199 A | 9/2001 |

(Continued)

*Primary Examiner* — Kenny A Cese
(74) *Attorney, Agent, or Firm* — Harness, Dickey & Pierce, P.L.C.

(57) ABSTRACT

A traveling position detection apparatus is provided. The traveling position detection apparatus includes: a map information storage part that stores map information including route information indicating a road route and lane marker information; a route position decision part that decides a route position that is a position on a road route based on a traveling speed, a traveling direction, and a positioning result; an offset position detection part that detects an offset position of a subject vehicle related to a lane markings by analyzing a road image and extracting the lane marking; and a traveling position decision part that decides the traveling position on a road based on the route position, an offset position, and lane marker information. When the offset position is not detected, the traveling position detection part estimates the traveling position based on the traveling speed, a traveling direction, and the already decided traveling position.

5 Claims, 21 Drawing Sheets

(56) References Cited

U.S. PATENT DOCUMENTS

| | | | |
|---|---|---|---|
| 2009/0118994 A1 | 5/2009 | Mori et al. | |
| 2011/0169958 A1* | 7/2011 | Imai | G01C 21/3658 |
| | | | 348/149 |
| 2015/0241232 A1* | 8/2015 | Park | G01C 21/3415 |
| | | | 701/412 |

FOREIGN PATENT DOCUMENTS

| | | |
|---|---|---|
| JP | 2007004669 A | 1/2007 |
| JP | 2007304965 A | 11/2007 |
| JP | 2009140192 A | 6/2009 |
| JP | 2009237901 A | 10/2009 |
| JP | 2010078387 A | 4/2010 |
| JP | 2011012965 A | 1/2011 |
| JP | 2013234902 A | 11/2013 |

\* cited by examiner (a)

(b)

(c)

(a)

(b)

(a)

(b)

(a)

(c)

(b)

(d)

(a) TRAVELING POSITION / ERROR OF ROUTE POSITION (b) TRAVELING POSITION (c) TRAVELING POSITION (a)

(b)

US 10,984,551 B2

TRAVELING POSITION DETECTION APPARATUS AND TRAVELING POSITION DETECTION METHOD

CROSS REFERENCE TO RELATED APPLICATIONS

This application is a U.S. National Phase Application under 35 U.S.C. 371 of International Application No. PCT/JP2017/005059 filed on Feb. 13, 2017 and published in Japanese as WO/2017/154464 A1 on Sep. 14, 2017. This application is based on and claims the benefit of priority from Japanese Patent Application No. 2016-043963 filed on Mar. 7, 2016 and Japanese Patent Application No. 2016-250222 filed on Dec. 23, 2016. The entire disclosures of all of the above applications are incorporated herein by reference.

TECHNICAL FIELD

The present disclosure relates to a technology detecting a traveling position where a subject vehicle travels on a road including a traveling lane divided by a lane marking.

BACKGROUND ART

It may be possible to use various driving assistance when a traveling position of a vehicle can be accurately detected. For example, it may be possible to guide a route to a destination position by referring to map information and to automatically reduce speed before a sharp curve.

In addition, it may be possible to provide a detailed driving assistance such as prompting a driver to early perform a traveling lane change when a detection accuracy of the traveling position can be improved to a degree capable of distinguishing whether the traveling lane on which a vehicle travels is on a traveling lane or a fast lane.

Though a technology detecting a traveling position by receiving a positioning signal from GNSS (Global Navigation Satellite System) satellite is known as technology detecting the traveling position of the vehicle, a detection result currently includes a large error and it may be difficult to distinguish whether the traveling position of the vehicle is on the road. Therefore, the position accuracy is improved to a practical degree by combining technology called as dead reckoning navigation and a technology called as map matching, in addition to the technology using the GNSS.

Here, the dead reckoning navigation is a method detecting a movement distance and a variation amount of a movement direction every moment, accumulating them, and thereby detecting a relative position from a reference position obtained at a certain time. Map matching is a method collating movement route obtained by the dead reckoning navigation with a road shape stored in the map information, and thereby identifying the traveling position of the vehicle on the map. Dead reckoning navigation cannot decide an traveling position accurately when a reference position is not determined accurately. Furthermore, as the vehicle becomes distant from the reference position, the detection accuracy of the traveling position deteriorates. The map matching does not always identify the traveling position since identifying the traveling position from a shape of the movement route. A practical accuracy is somehow secured by combining the technologies currently. It may be difficult to secure the position accuracy at a degree capable of distinguishing the traveling lane during traveling.

A technology securing the position accuracy capable of distinguishing the traveling lane where the subject vehicle travels by detecting the lane marking on the road in an image photographed by an onboard camera is proposed (Patent Literature 1).

PRIOR ART LITERATURES

Patent Literature

Patent Literature 1: JP 2010-78387 A

SUMMARY OF INVENTION

However, according to the presented technology, when, for example, the lane marking cannot be detected for some reason that a lane marking is faded, covered with snow or the like, it may be difficult to secure the position accuracy capable of distinguishing the traveling lane during traveling.

It is an object of the present disclosure to provide a technology enabling to decide a traveling position with a position accuracy capable of distinguishing a traveling lane where a vehicle travels even when a lane marking cannot be detected for some reason.

A traveling position detection apparatus and a traveling position detection method according to one aspect of the present disclosure store map information including route information showing a route of a road on a map and lane marking information related to lane marking drawn on the road. The traveling position detection apparatus and the traveling position detection method photograph the road image from a subject vehicle, extract the lane marking, and decide the traveling position of the subject vehicle including a position in a width direction on the road by using a position of the extracted lane marking and the lane marking information. The traveling position detection apparatus and the traveling position detection method estimate the traveling position of the subject vehicle on the road (that is, the traveling position of the subject vehicle including the position in the width direction on the road) based on a traveling speed of the subject vehicle, a traveling direction and the traveling position previously decided when the lane marking cannot be extracted from the road image.

Thereby, it may be possible to decide the traveling position with the position accuracy capable of distinguishing the traveling lane during traveling when the lane marking can be extracted from a road image. It may be possible to estimate the traveling position of the subject vehicle on the map even when the lane marking cannot be extracted from the road image. The traveling position already obtained is set as a reference and the traveling position is estimated based on a traveling speed and a traveling direction of the subject vehicle of the own vehicle when the traveling position on the map is estimated. Therefore, it may be possible to secure the position accuracy capable of distinguishing the traveling lane during traveling.

BRIEF DESCRIPTION OF DRAWINGS

The above and other aspects, features and advantages of the present disclosure will become more apparent from the following detailed description made with reference to the accompanying drawings. In the drawings.

DESCRIPTION OF EMBODIMENTS

Hereinafter, embodiments will be explained.

Figure 1:
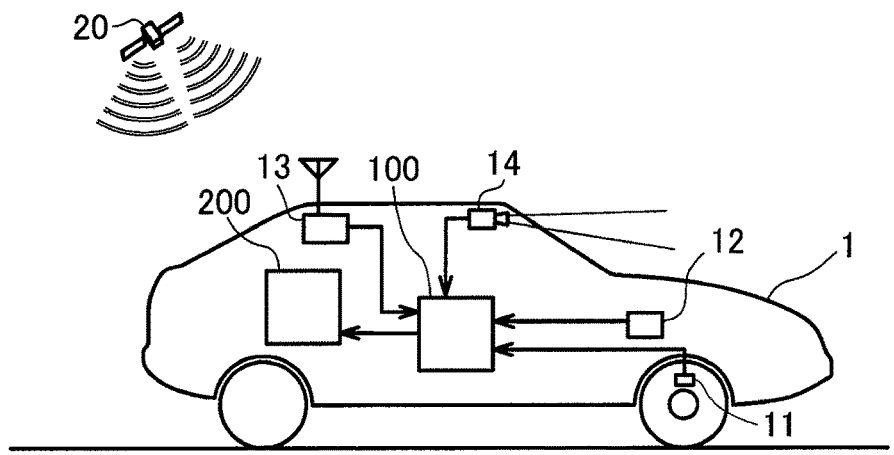
FIG. 1 is an explanatory view illustrating a subject vehicle installed with a traveling position detection apparatus.

A. Apparatus Configuration:

FIG. 1 shows a schematic configuration of a subject vehicle 1 installed with a traveling position detection apparatus 100 according to a present embodiment. As shown in the drawings, a subject vehicle 1 is installed with a vehicle speed sensor 11, an azimuth sensor 12, a positioning apparatus 13, an onboard camera 14, a driving assist apparatus 200 or the like together with the traveling position detection apparatus 100.

The vehicle speed sensor 11 detects the number of rotations of an axle or a tire of the subject vehicle 1, and outputs to the traveling position detection apparatus 100. The vehicle speed of the subject vehicle 1 can be calculated when the number of the rotations of the tire or the axle per unit time is understood.

The azimuth sensor 12 outputs data for a traveling direction of the subject vehicle 1. The azimuth sensor 12 may be a gyro sensor, a geomagnetic sensor or the like. For example, a gyro sensor outputs the variation amount of the traveling direction of the subject vehicle 1 when the gyro sensor is used as the azimuth sensor 12. Therefore, the traveling position detection apparatus 100 may be possible to detect the traveling direction of the subject vehicle 1 by accumulating the outputs outputted by the gyro sensor. Information of azimuth is outputted based on a direction of geomagnetism when the geomagnetic sensor is used as the azimuth sensor 12. Therefore, the traveling position detection apparatus 100 may be possible to detect the traveling direction of the subject vehicle 1 based on the output.

The positioning apparatus 13 receives a positioning signal from a positioning satellite 20 and analyzes the received positioning signal and thereby calculates a positioning result including position information, speed information or the like.

The onboard camera 14 photographs an image showing the road in which the subject vehicle 1 travels (hereinafter, may be referred to as a road image) at a fixed cycle (for example, 30 msec) and outputs to the traveling position detection apparatus 100.

The traveling position detection apparatus 100 acquires the vehicle speed of the subject vehicle 1 based on the output of the vehicle speed sensor 11. The traveling position detection apparatus 100 acquires the traveling direction of the subject vehicle 1 based on the output of the azimuth sensor 12. Furthermore, the traveling position detection apparatus 100 acquires the position information from the positioning apparatus 13. The traveling position detection apparatus 100 determines the traveling position of the subject vehicle 1 by using these information and the map information stored in advance.

Furthermore, the traveling position detection apparatus 100 analyzes the road image acquired by the onboard camera 14 and extracts the lane marking dividing the traveling lane of the road on which the subject vehicle 1 travels. The traveling position detection apparatus 100 detects the position in a width direction or the traveling lane on the road during traveling, based on a position relation between the extracted lane marking and the subject vehicle 1. The traveling position detection apparatus 100 outputs the position in the width direction or the traveling lane on the detected road to the driving assist apparatus 200. Thereby, it may be possible to perform a detailed driving assist such as guiding a traveling lane change in advance before right turn or left turn.

The lane marking of the present disclosure may be a line dividing a traveling lane on the road. The lane marking is not always necessarily to be a line dividing the traveling lane. Hence, the lane marking of the present disclosure includes also a line dividing a road side strip existing in both sides on the road of single lane and the traveling lane such as a narrow farm road or a one-way alley, for example.

The lane marking of a road surface may be disappearing, the lane marking may not be visible due to an influence of snow or rain, or the lane marking may not be detected for some reason such as connection failure of the onboard camera 14. In this case, it may be difficult to decide the position in the width direction on the road and may cause difficulty for the driving assist.

The traveling position detection apparatus 100 of the embodiment employs a configuration as bellow in order to prevent difficulty in the driving assist, even when the lane marking may be difficult to be detected by some reason.

Figure 2:
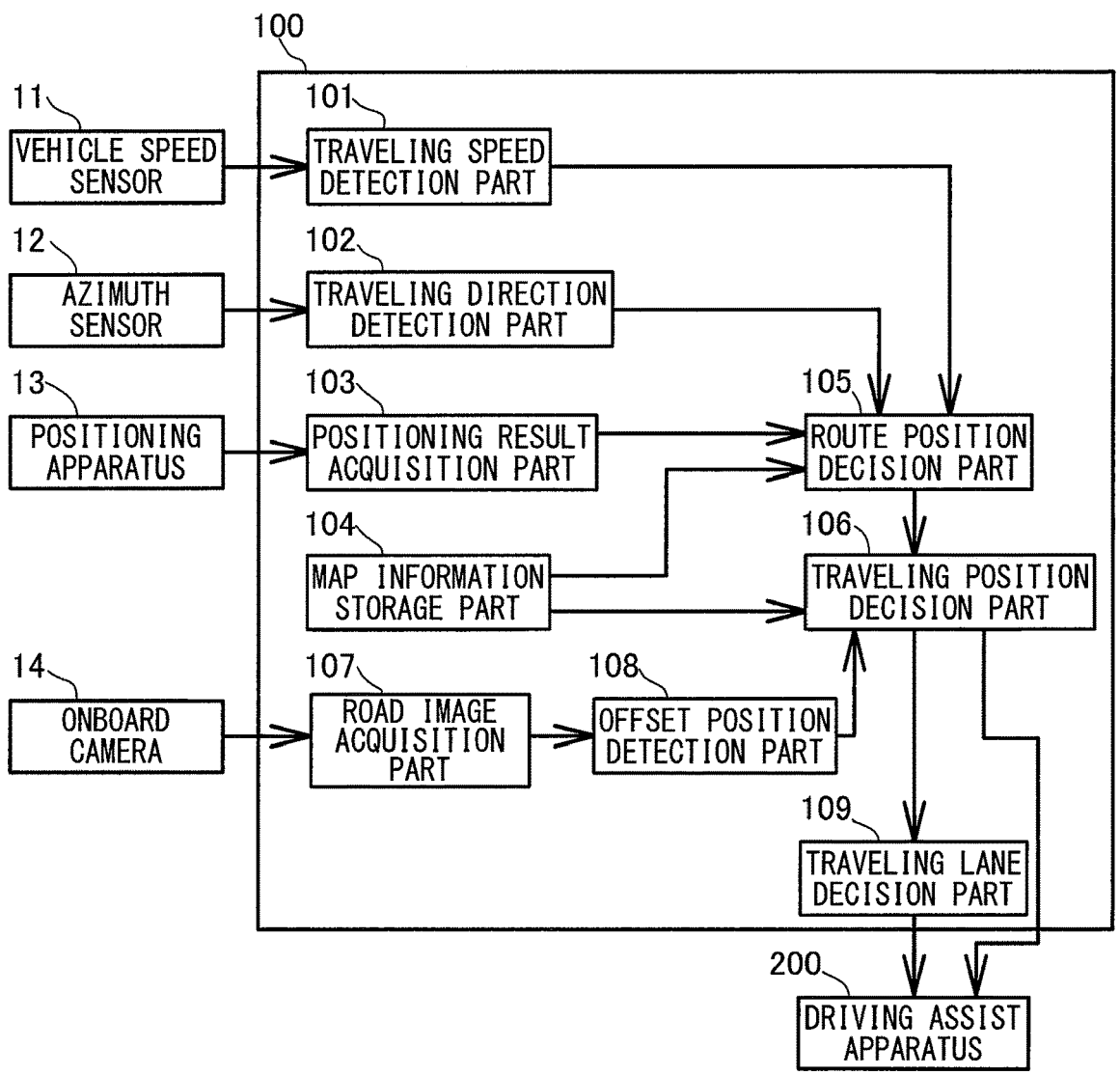
FIG. 2 is a block diagram showing a schematic internal structure of the traveling position detection apparatus.

FIG. 2 shows a block diagram showing a schematic internal structure of the traveling position detection apparatus 100 of the embodiment. The traveling position detection apparatus 100 of the embodiment as shown in FIG. 2 includes a traveling speed detection part 101, a traveling direction detection part 102, a positioning result acquisition part 103, a map information storage part 104, a route position decision part 105, a traveling position decision part 106, a road image acquisition part 107, an offset position detection part 108 and a traveling lane decision part 109.

These "parts" are abstract concept. The abstract concept focuses on function that the traveling position detection apparatus 100 of the embodiment includes in order to decide the traveling position including also the position in the width direction of the road. The abstract concept conventionally categorizes an internal part of the traveling position detection apparatus 100. Hence, these "parts" does not show that the traveling position detection apparatus 100 is physically divided. These "parts" may be possible to be implemented as a computer program executed by CPU, implemented as an electronic circuit including LSI and furthermore implemented as these combination.

The traveling speed detection part 101 acquires the traveling speed based on the number of the rotations of the tire or the axle received from the vehicle speed sensor 11 and outputs to the route position decision part 105.

The traveling direction detection part 102 outputs the traveling direction to the route position decision part 105 after the traveling direction detection part 102 acquires the traveling direction of the subject vehicle 1 based on the output by the azimuth sensor 12. As described above, the traveling direction of the subject vehicle 1 can be calculated by accumulating the output of the sensor when the azimuth sensor 12 is the gyro sensor. The traveling direction of the subject vehicle 1 can be calculated by converting the output of the sensor when the azimuth sensor 12 is the geomagnetic sensor.

The positioning result acquisition part 103 receives from the positioning apparatus 13, the position information of the subject vehicle 1 which the positioning apparatus 13 calculates based on the positioning signal from the positioning satellite 20. The positioning result acquisition part 103 outputs the position information to the route position decision part 105.

The route position decision part 105 receives the traveling speed, the traveling direction and the positioning result. The route position decision part 105 refers the map information stored in the map information storage part 104. The route position decision part 105 decides the route position where the subject vehicle 1 travels. That is, as described above by using FIG. 1, the traveling position detection apparatus 100 may be possible to decide the traveling position of the subject vehicle 1 including the position in the width direction on the road where the subject vehicle 1 travels. However, before the decision, the traveling position detection apparatus 100 decides the position of the subject vehicle 1 on the road without including the position in the width direction as the route position. In the present disclosure, the "route position" represents a position on a road that does not include a position in a width direction. By contrast, the "traveling position" represents a position including the position in the width direction.

The road image acquisition part 107 acquires the road image from the onboard camera 14, and outputs the acquired road image to the offset position detection part 108.

The offset position detection part 108 extracts the lane marking from the road image by analyzing the road image. The offset position detection part 108 detects the offset position of the subject vehicle 1 with respect to the lane marking based on the extracted result of the lane marking. Here, the "offset position" is a distance measured from the subject vehicle 1 to the lane marking on the road.

The traveling position decision part 106 acquires the route position of the subject vehicle 1 from the route position decision part 105, and acquires the map information to the route position from the map information storage part 104. The map information storage part 104 stores the route information showing the route of the road on the map and the information with respect to the lane marking shown on the road, as described later in detail. The traveling position decision part 106 decides the traveling position of the subject vehicle 1 including the position in the width direction on the road based on the lane marking information with respect to the route position of the subject vehicle 1 and the offset position to the lane marking of the subject vehicle 1. After the decision of the traveling position of the subject vehicle 1, the traveling position decision part 106 outputs the decided traveling position to a driving assist apparatus 200.

The traveling lane decision part 109 decides the position of the traveling lane on which the subject vehicle 1 is travelling, based on the traveling position of the subject vehicle 1 decided by the traveling position decision part 106 (that is, the route position or the position in the width direction on the road). The traveling lane decision part 109 outputs the decided traveling lane to the driving assist apparatus 200.

According to the embodiment, though it is explained that the traveling position and the traveling lane of the subject vehicle 1 are outputted to the driving assist apparatus 200, either one of the traveling position or the traveling lane of the subject vehicle 1 may be outputted.

The traveling position detection apparatus 100 of the embodiment has the configuration as above. Therefore, the traveling position detection apparatus 100 of the embodiment may be possible to decide the position in the width direction on the road even when the lane marking on the road disappears and a portion where the lane marking cannot be detected due to snow or the like exists, and furthermore the road image cannot be temporally acquired by a connection failure of the onboard camera 14 or the like. Hereinafter, a process that the traveling position detection apparatus 100 of the embodiment decides the position in the width direction on the road will be explained.

Figure 3:
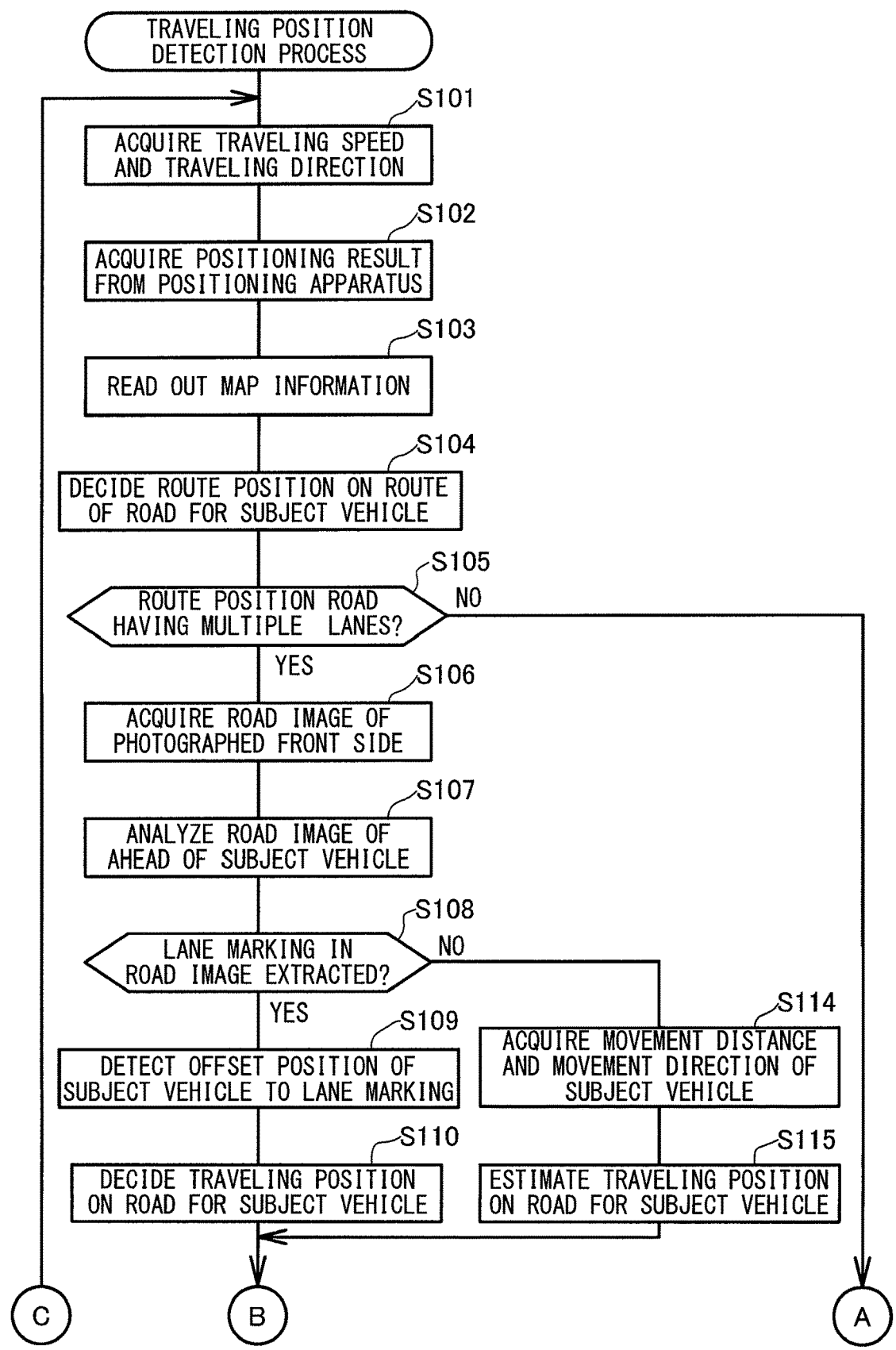
FIG. 3 is a flowchart showing a first part of a traveling position detection process.
Figure 4:
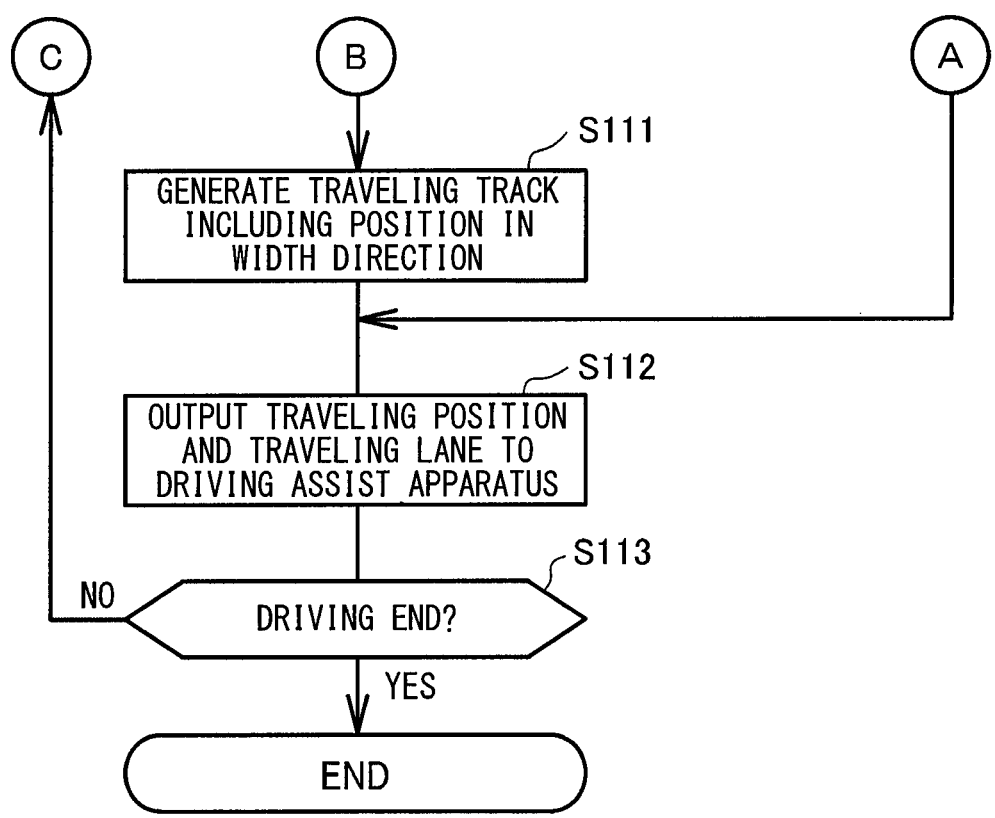
FIG. 4 is a flowchart showing a second part of the traveling position detection process.

B. Traveling Position Detection Process:

FIG. 3 and FIG. 4 show a flowchart of the traveling position detection process executed by the traveling position detection apparatus 100.

In the traveling position detection process, at first, the traveling speed of the subject vehicle is acquired based on the output of the vehicle speed sensor 11 and furthermore the traveling direction of the subject vehicle 1 is acquired based on the output of the azimuth sensor 12 (S101).

Next, the positioning result including the position information (hereinafter, a positioning position) of the subject vehicle 1 calculated based on the positioning signal by the positioning apparatus 13 is acquired from the positioning apparatus 13 (S102).

Peripheral map information of the subject vehicle 1 is acquired from the map information storage part 104 by using the positioning position of the subject vehicle 1 included in the positioning result (S103). The map information stored by the map information storage part 104 of the embodiment includes two kinds of information that are the route information and the lane marking information. Here, the route information describes a shape of the road on the map such as a traffic intersection between the roads or such as the length of the road without considering a width of the road. According to the present disclosure, "route" means a shape of the road on the map without considering the width of the road. The lane marking information includes a presence or absence of the lane marking shown on the road, a type of the lane marking, and the position of the lane marking in the width direction on the road. The lane marking in the present disclosure includes not only a line that divides traveling lanes but also a line that divides the road side strip and the traveling lane.

Figure 5:
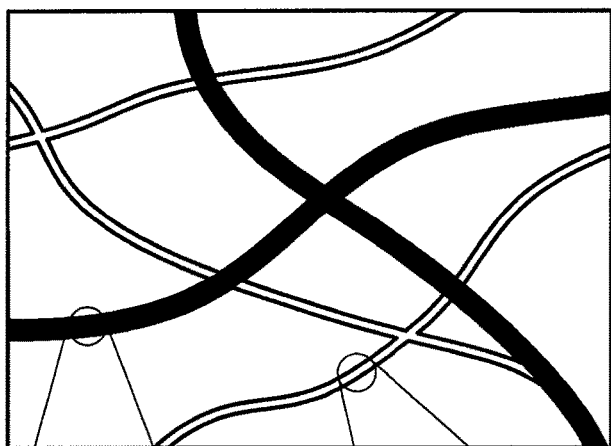
FIG. 5 is an explanatory view exemplifying map information including lane marking information.
Figure 5:
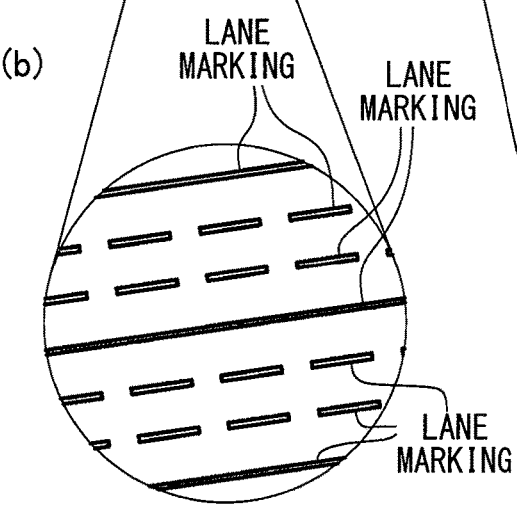
Figure 5:
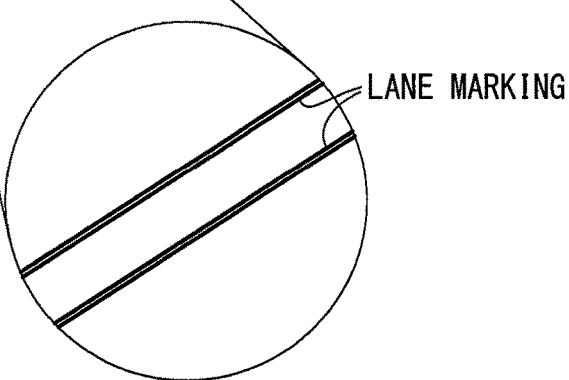

FIG. 5 exemplifies the map information stored in the map information storage part 104 of the embodiment. A part (a) of FIG. 5 conceptually shows the route information stored in the map information. The map information shows the shape of the road on the map, as shown in the drawing. Hence, it may be possible to acquire information such as the direction of the road, a position of the traffic intersection, a distance to a next intersection, and furthermore driving directions when the route information is read out.

As described above, the map information of the embodiment stores the lane marking information. When the lane marking is read out, it may be possible to acquire more detailed information about the road. It may be possible to acquire the information such that the road is either single lane or plural lanes by reading out the lane marking information of the road since the lane marking includes the presence of the lane marking shown on the road, the position of the lane marking or a type of the lane marking or the like, for example. The part (a) of FIG. 5 shows the road of the plural lanes with black paint and the single lane with white blank, as one of the examples.

A part (b) of FIG. 5 conceptually shows the lane marking information storing with the road shown with black paint in the part (a) of FIG. 5. According to the lane marking information, it is understood that the road of the position shown in the part (b) of FIG. 5 has six lanes including three lanes on one way, a white broken-line lane marking (that is, a white lane marking intermittently drawn) divides the one way into three lanes, and furthermore a lane marking with a white solid line (that is, a white lane marking continuously drawn) divides between the one way with three lanes and the other way with three lanes in a opposite side.

A part (c) of FIG. 5 conceptually shows the lane marking information storing with respect to the road shown with black paint in the part (a) of FIG. 5. According to the lane marking information, it is understood that the road of the position shown in the part (c) of FIG. 5 is divided into a single lane and road side strips in both sides by white solid lanes.

It may be possible to obtain the detailed information with respect to the lane marking shown on the road when the lane marking is read out.

When the traveling speed, the traveling direction, the positioning result, and the map information of the subject vehicle 1 are acquired, the position on the route of the subject vehicle 1 (hereinafter, route position) is decided by using the traveling speed, the traveling direction, the positioning result, and the map information (S104 in FIG. 3). In regard to a method deciding the route position with use of the traveling speed, the traveling direction or the like, known various methods can be used.

It is determined whether the road of the route position is plural traveling lanes by using the lane marking information of the map information (S105). That is, a necessity of executing the process deciding the position in the width direction occurs so that the driving system considering the position in the width direction on the road is provided when the road during traveling is plural traveling lanes. However, the process is unnecessary when the road is the single lane. The route position of the subject vehicle 1 is decided (S104), and it is determined whether the road of the route position is plural traveling lanes.

Consequently, when the road of the route position is not plural traveling lanes (S105: no), it is determined that the decision of the position in the width direction is unnecessary and the route position is outputted to the driving assist apparatus (S112 in FIG. 4).

It is determined whether the driving ends (S113). The process returns to the beginning of the traveling position detection process of the embodiment and the output of the vehicle speed sensor and the azimuth sensor is acquired again (S101 in FIG. 3) when the process does not end (S113: no). By contrast, the traveling position detection process ends when the driving ends (S113: yes).

By contrast, it may be preferable to provide the driving assist on a basis of traveling lane where the subject vehicle 1 travels, when the road of the route position is plural traveling lanes (S105: yes). A necessity of detecting the position in the width direction on the road occurs to provide the driving assist on a basis of the traveling lane. The road image ahead of the subject vehicle 1 is acquired from the onboard camera 14 in order to detect the position in the width direction on the road (S106). According to the embodiment, it is explained that the road image showing ahead of the subject vehicle 1 is acquired, an image with the lane marking is needed, hence the road image with a side of the subject vehicle 1 may be acquired.

The lane marking dividing the traveling lanes may be shown in the road image since the road during traveling is plural traveling lanes. The lane marking is extracted from the road image (S107).

Figure 6:
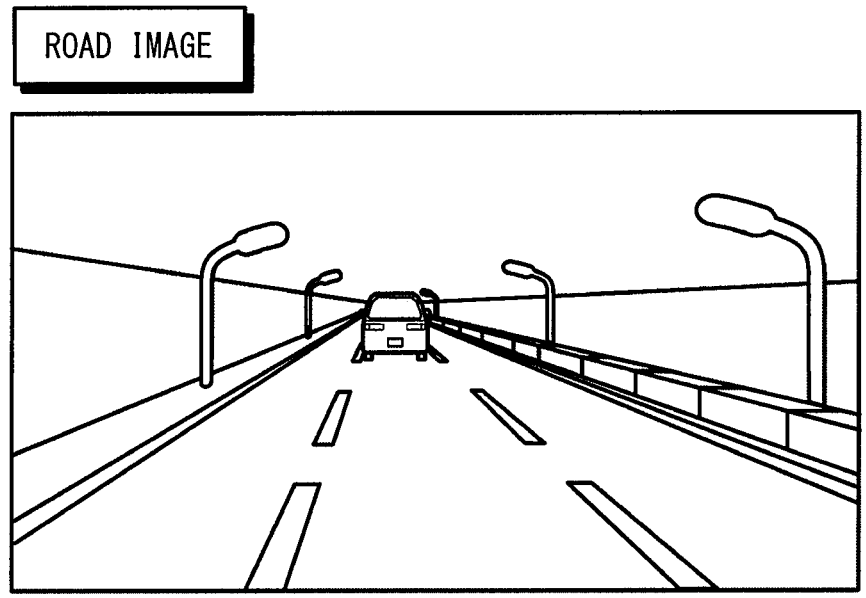
FIG. 6 is an explanatory view exemplifying how the lane marking is extracted from a road image.
Figure 6:
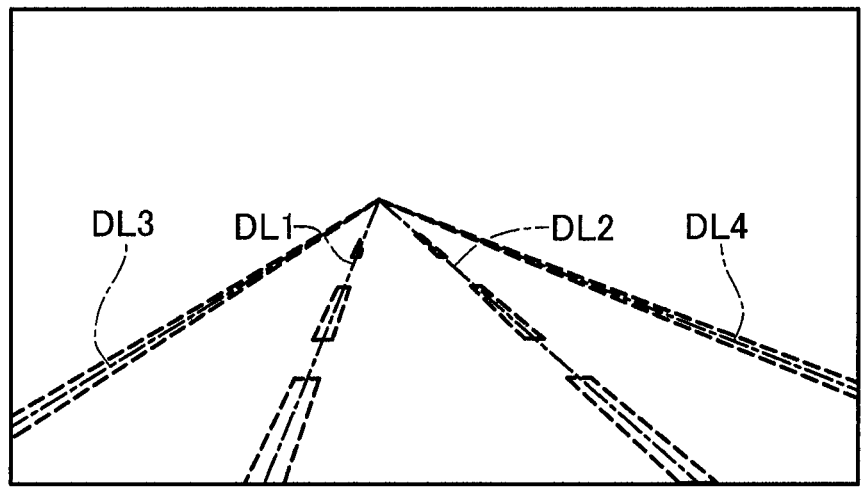

FIG. 6 exemplifies how the lane marking is extracted from the road image of the road including the plural traveling lanes. A part (a) of FIG. 6 shows the road image. The road image includes many objects such as a front vehicle, the road side strip, a median strip, and a street lamp in addition to the lane marking. It may be possible to extract a portion showing the lane marking from the road image, by focusing on a character such as shape, color, furthermore points formed by connecting along in a traveling direction of the subject vehicle 1.

By extracting the portion showing the lane marking from the road image, it is possible to acquire the image shown by a broken arrow in a part (b) of FIG. 6 The lane marking is finally extracted by detecting a central line since the obtained lane marking has a width. The part (b) of FIG. 6 shows the finally extracted lane marking by a dot dash line.

Next, it is determined whether the lane marking in the road image is extracted (S108 in FIG. 3). That is, the case where the lane marking disappears or is out of sight occurs even when it is set that the lane marking exists in the lane marking information. Therefore, it is determined whether the lane marking is extracted from the road image.

In the example shown in the part (b) of FIG. 6, two lane markings dividing into the three traveling lanes, a lane marking between a road side strip in a left side of the three traveling lanes and the left traveling lane, and a lane marking between a road side strip in a right side of the three traveling lanes and the right traveling lane are extracted. Hereinafter, a left lane of the two lane markings dividing into the three traveling lanes is referred to as a DL1, a right lane of the two lane markings dividing into the three traveling lanes is referred to as a DL2, the lane marking between the road side strip in the left side of the three traveling lanes and the left traveling lane is referred to as a DL3, and a lane marking between a road side strip in a right side of the three traveling lanes and the right traveling lane is referred to as a DL4.

Consequently, when the lane marking in the road image is extracted (S108 in FIG. 3: yes), an offset position of the subject vehicle 1 to the lane marking is detected as bellow (S109). Here, the offset position of the subject vehicle 1 to the lane marking is a distance between the subject vehicle 1 and the lane marking, the distance being measured from the subject vehicle 1 to the lane marking in the width direction of the road.

Figure 7:
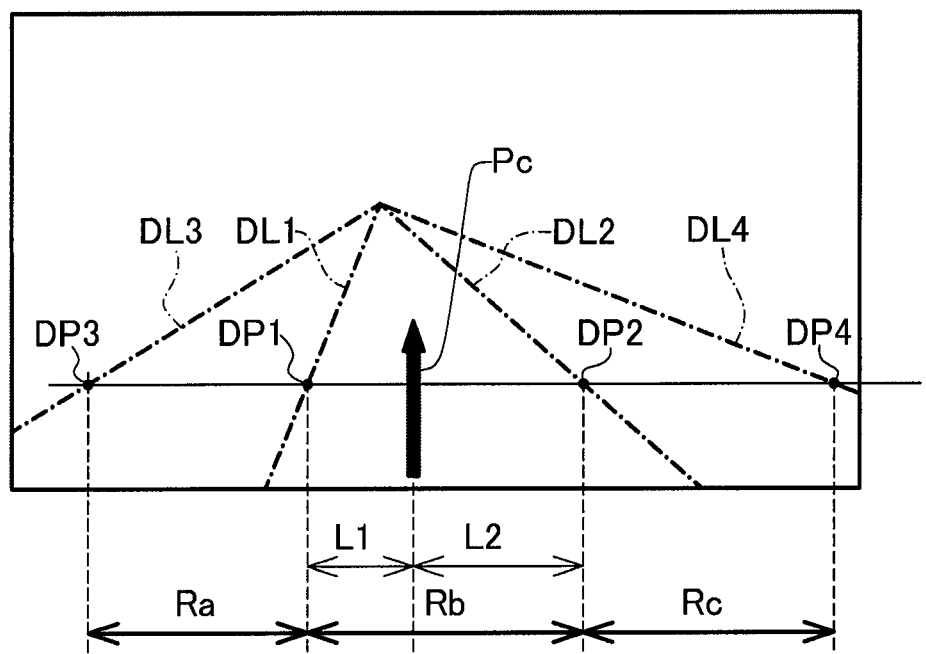
FIG. 7 is an explanatory view showing how a position in a width direction on a road is decided based on the lane marking information of a lane marking and the map information extracted from the road image.
Figure 7:
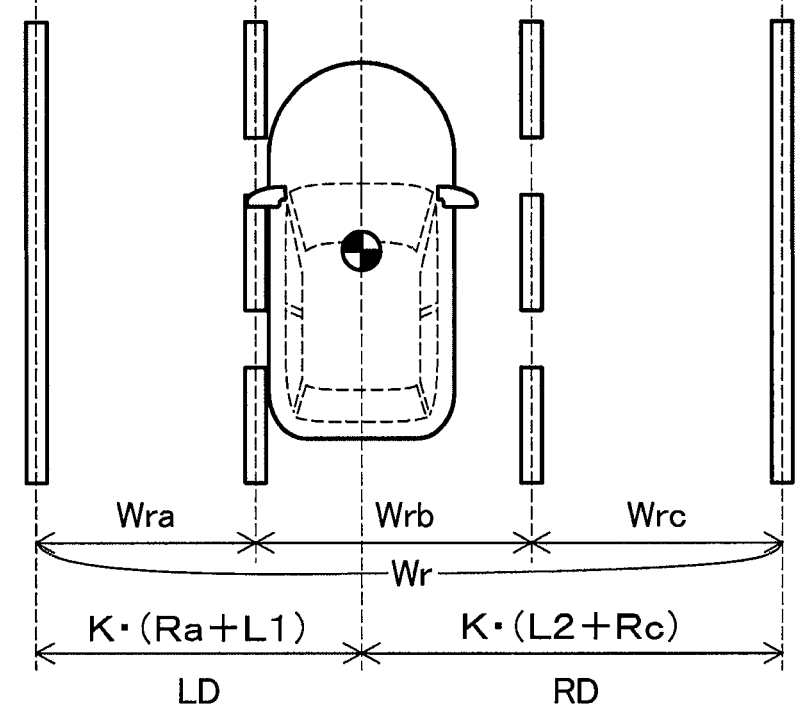

FIG. 7 shows a method detecting the offset position of the subject vehicle 1 to the lane marking.

An image in the range that always remains constant from the subject vehicle 1 is in the road image since the onboard camera 14 photographing the road image is fixed to a vehicle body in a state that the onboard camera 14 is directed to a front side of the subject vehicle 1. A photographic subject positioned right in front of the subject vehicle 1 is always somewhere on a similar straight line on the road image. A photographic subject positioned at a similar distance on the road and positioned in the front of the subject vehicle 1 is at a similar height from a lower end of the road image. By using this, it may be possible to find a position relation between the lane marking and the subject vehicle 1.

An arrow Pc shown with black paint in a part (a) of FIG. 7 shows a position of a central axis of the subject vehicle 1 on the road image. The position of the lane marking on the road image is detected at a position of a predetermined height from the lower end of the road image. Here, as described above by using FIG. 6, the four lane markings DL1 to DL4 are extracted. Therefore, positions where the lane markings DL1 to DL4 are detected at predetermined height are set as points DP1 to DP4.

A distance L1 from the arrow Pc showing the central axis of the subject vehicle 1 to the point DP1 in the left side is detected, and a distance L2 from the arrow Pc to the point DP2 in the right side is detected. Furthermore, a distance Ra from the point DP1 to the point DP3 on the road image and the distance Rc from the point DP2 to the point DP4 are detected.

Information of the distance between the lane markings on an actual road is stored in the lane marking information of the map information. Hence, it may be possible to calculate the position of the subject vehicle 1 in the width direction of the road as described below by using the distances L1, L2, Ra, and Rc found from the road image and the information of the distance on the actual road stored in the lane marking information.

A road width (that is, a distance from the lane marking DL3 in a left end to the lane marking DL4 in a right end) on the road image becomes Ra+L1+L2+Rc, as shown in the part (a) of FIG. 7.

A distance from the lane marking DL3 in the left end to the central of the subject vehicle 1 on the road image becomes Ra+L1. A distance from the subject vehicle 1 to the lane marking DL4 in the right end becomes L2+Rc.

The lane marking information stores widths of each traveling lane on the actual road. Here, it is supposed that the widths of the three traveling lanes are stored as Wra, Wrb, and Wrc in order from left side. An actual road width Wr becomes Wra+Wrb+Wrc. The actual road width Wr corresponds to Ra+L1+L2+Rc on the road image.

The distance found from the lower end of the image to the predetermined height on the road image (that is, a distance on the road image) is multiplied by a conversion coefficient K (=Wr/(Ra+L1+L2+Rc)), and thereby it may be possible to convert to a distance on the actual road.

The subject vehicle 1 on the actual road is present at a distance LD being K·(Ra+L1) from the left side of the road since the distance from the lane marking DL3 in the left end to the central of the subject vehicle 1 on the road image is Ra+L1. Similarly, the subject vehicle 1 is present at a distance RD being K·(L2+Rc) from the right side of the road.

Furthermore, it may be possible to decide the traveling lane where the subject vehicle 1 travels when the calculated distances LD, RD and the widths of the traveling lanes Wa, Wb, and Wc stored as the lane marking information are compared.

In S109 of FIG. 3, the distance from the lane marking DL3 in the left end on the road image to the central of the subject vehicle 1 (Ra+L1 in the example described above) and the distance from the lane marking DL4 in the right end on the road image to the central of the subject vehicle 1 (L2+Rc in the example described above) each is detected as the offset position.

The position of the subject vehicle 1 in the width direction on the actual road is decided based on the lane marking information, as described above (S110). That is, the traveling position on the road including the position in the width direction is decided in S110 since the position on the road (that is, the route position) in the case where the width of the road is not considered is founded in S104, as described above.

In the above explanation, it is explained that the distance from the lane marking DL3 in the left end of the road to the subject vehicle 1 on the road image and the lane marking DL4 in the right end on the road image to the subject vehicle 1 are detected as the offset position. It is explained that the conversion coefficient K is found by calculating sum of distance obtained as the offset position and ratio of the actual road width.

However, each of the distance L1 from the subject vehicle 1 to the left adjacent lane marking DL1 and the distance L2 from the subject vehicle 1 to the right adjacent lane marking DL2 on the road image may be detected as the offset position. The conversion coefficient K may be founded by calculating sum of distance obtained as the offset position and ratio of the actual road width Wrb.

When the traveling position is decided, a traveling track of the subject vehicle 1 on the road is generated (S111 in FIG. 4).

Figure 8:
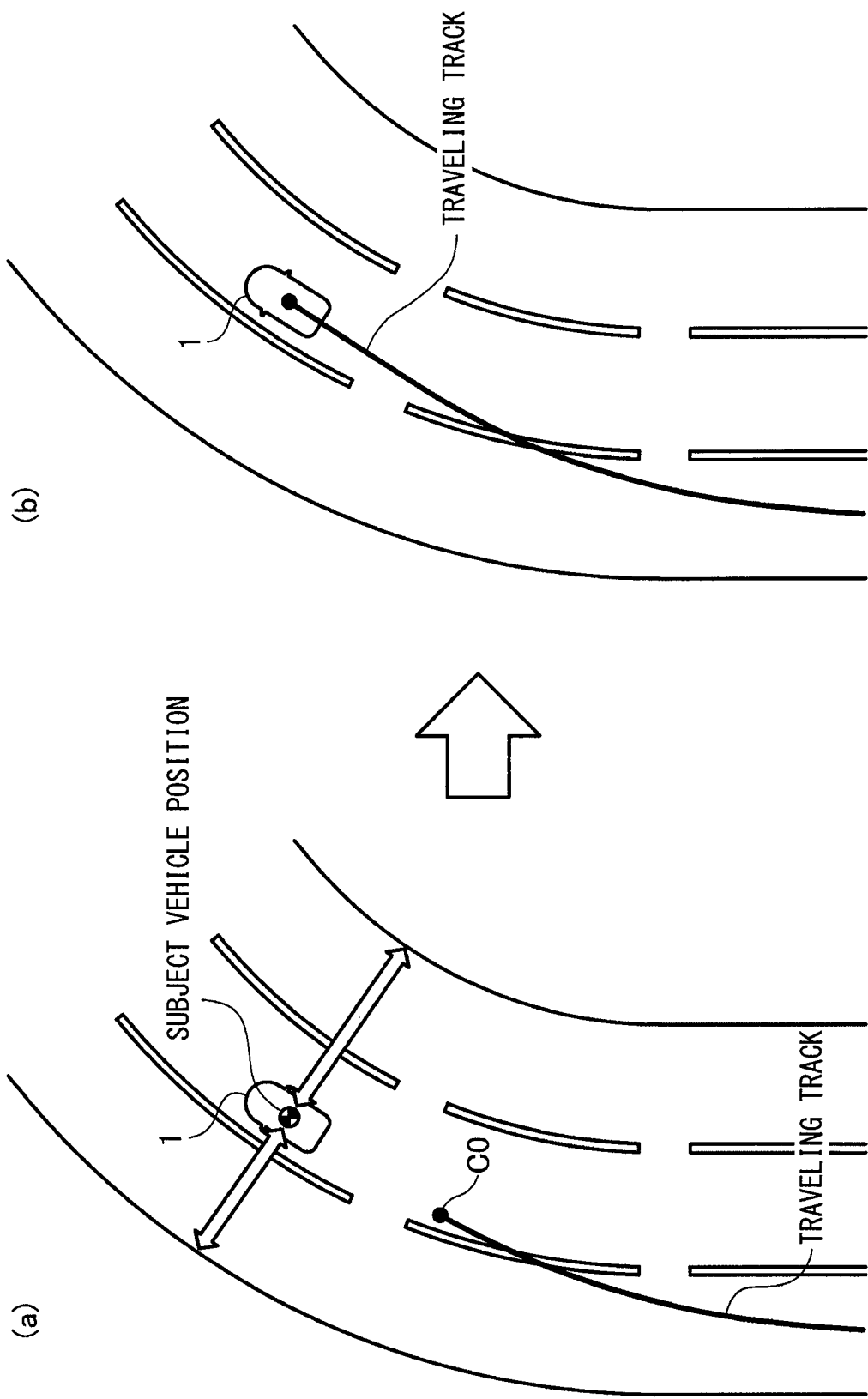
FIG. 8 is an explanatory view showing how a traveling track is generated by deciding a subject vehicle position based on the lane marking and the map information extracted from the road image.

FIG. 8 exemplifies how the traveling track on the road is generated. A part (a) of FIG. 8 shows a traveling track generated in the past by a bold solid line. A position CO shown by a black circle in the drawing shows a traveling position decided at the last time.

As described above, in S110 of FIG. 3, it may be possible to generate a new traveling track as shown in a part (b) of FIG. 8 by connecting the last decided traveling position and a new traveling position on the road since the new traveling position is decided based on both ends of the road. In S111 of FIG. 4, the decided traveling position is stored and the traveling track is newly generated.

The decided new traveling position is outputted to the driving assist apparatus 200 (S112). Thereby, the driving assist apparatus 200 may be possible to receive the traveling position including the position in the width direction of the road. Therefore, it may be possible to provide the detailed driving assist such as guidance of the traveling lane change, for example.

Simply, the subject vehicle 1 may output the traveling lane where the subject vehicle 1 travels instead of the traveling position though it is explained that the traveling position is outputted towards the driving assist apparatus 200, here. That is, it may be possible to decide the traveling lane where the subject vehicle 1 travels when the traveling position including the position in the width direction on the road is understood, since the lane marking information stores the distance between the lane markings. Therefore, the traveling lane may be outputted instead of the traveling position.

After that, it is determined whether the driving ends (S113). When the driving does not end (S113: no), a series of the process described above starts after the process returns to the start of the traveling position detection process, and the outputs of the vehicle speed sensor and the azimuth sensor are acquired (S101 of FIG. 3).

By contrast, when the driving ends (S113: yes), the traveling position detection process of the embodiment ends.

In the above, the process at when the lane marking in the road image can be extracted (S108 in FIG. 3: yes) is explained.

By contrast, it is impossible to decide the traveling position of the subject vehicle 1 according to the above described method (that is, the method using the offset position to the lane marking) when the lane marking cannot be extracted from the road image (S108: no). In this case, it is impossible to generate the traveling track. Therefore, the traveling track is generated by using another method bellow.

A movement distance and a movement direction of the subject vehicle 1 are acquired (S114). The acquired movement distance and the acquired movement direction are a distance and a movement direction from the traveling position decided at the previous time. It may be possible to easily find the movement distance and the movement direction of the subject vehicle 1 since the movement distance and the movement direction of the subject vehicle 1 are acquired in S101 and furthermore elapsed time from when the traveling position is decided at the previous time is understood.

The traveling position (that is, the route position and the position in the direction on the road) is estimated based on the movement distance and the movement direction of the subject vehicle 1 (S115). A traveling position at a present time may be estimated when the traveling position at the previous time is not the position decided in S110 but the position estimated in S115.

Figure 9:
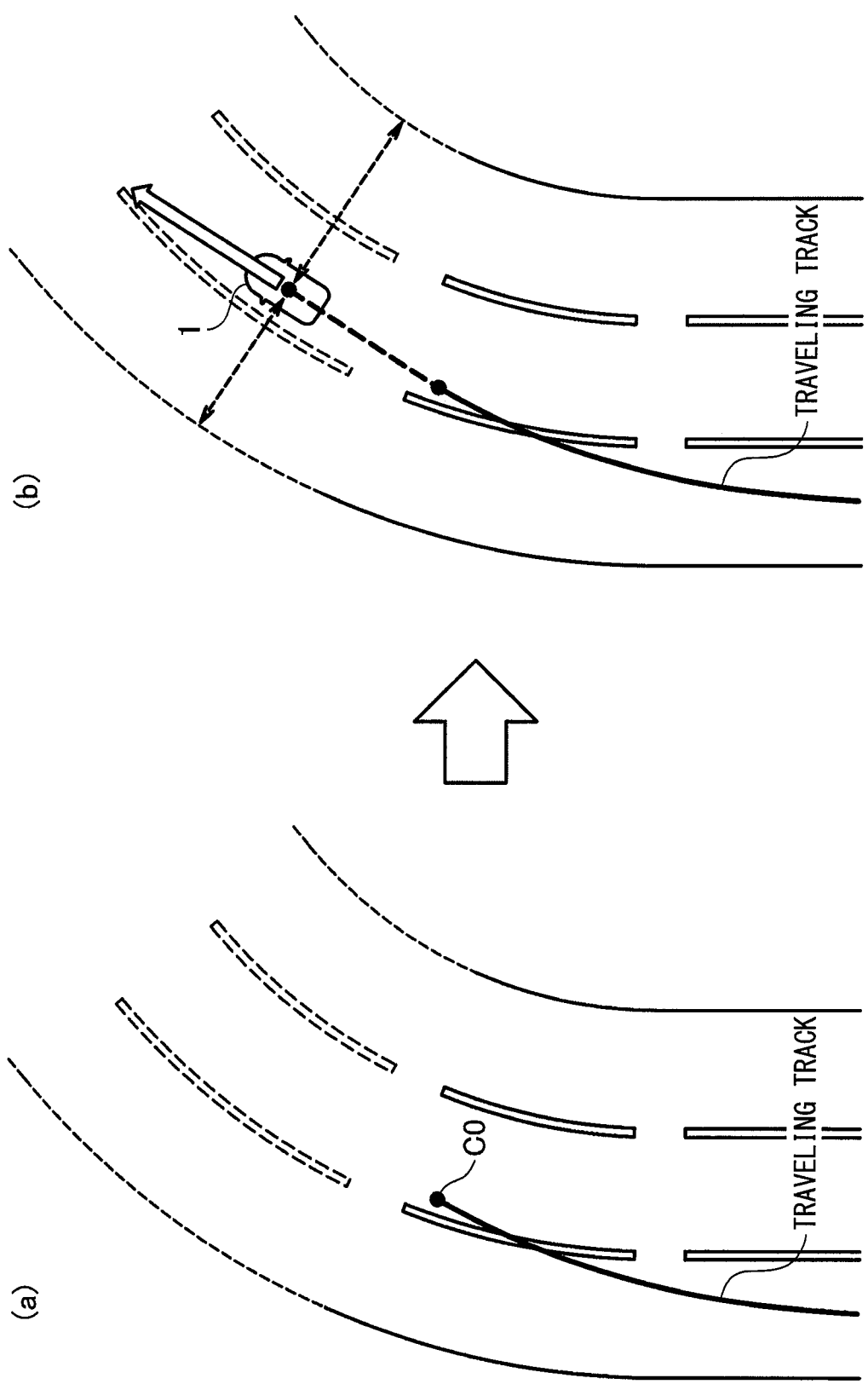
FIG. 9 is an explanatory view exemplifying how the traveling track is estimated based on the traveling speed or the traveling direction of the subject when the lane marking cannot be extracted from the road information.

FIG. 9 shows a method estimating the new traveling position based on the movement distance and the movement direction from the traveling direction of the subject vehicle 1.

A bold solid line shown in a part (a) of FIG. 9 shows the traveling track already acquired and the position CO shown at a tip of the traveling track by a black circle shows the traveling position at the previous time stored at the last time.

The present traveling speed and the present traveling direction are understood though it is not understood how far the present traveling position exists from the back circle position CO in any direction. It may be possible to estimate the movement distance and the movement direction from the position CO of the black circle (that is, previous traveling position) to the traveling position when the present traveling position moves from the position CO of the black circle at the traveling speed in the traveling direction. Therefore, it may be possible to estimate the present traveling position.

In this way, a bold broken line shown in a part (b) of FIG. 9 shows that the new traveling position is estimated based on the traveling speed and the traveling direction.

Estimating the new traveling position is also similar to estimate a new offset position (here, distance from both ends of the road). Thus, when the lane marking cannot be detected from the road image, the offset position and the traveling position are decided in the order opposite to a case where the lane marking can be extracted from the road image. That is, the traveling position of the subject vehicle 1 is decided by using the offset position and the lane marking information to the extracted lane marking as described above when the lane marking is extracted from the road image. By contrast, the traveling position on the road is estimated based on the traveling speed and the map information (that is, the route information and the lane marking information) when the lane marking cannot be extracted. The offset position is estimated based on the estimated traveling position and the estimated lane marking information.

In the part (b) of FIG. 9, the broken arrow shown on both sides of the subject vehicle 1 shows the offset position from the subject vehicle 1 to the both sides of the road.

It is explained that the movement distance and the traveling direction from the traveling position at the previous time are acquired based on the traveling speed and the traveling direction acquired at the moment when the lane marking cannot be extracted from the road image, in the above explanation (refer to S114 in FIG. 3). Thus, when the lane marking can be extracted from the road image, it may be possible to discard the traveling speed and the traveling direction acquired at the moment since the traveling speed and the traveling direction acquired is unnecessary.

However, the traveling speed and the traveling direction acquired at the moment may be stored even when the lane marking can be extracted from the road image. The present traveling position may be estimated by using the traveling speed and the traveling direction at when the traveling position at the previous time is obtained instead of using the traveling speed and the traveling direction at the moment when the lane marking cannot be extracted from the road image.

The traveling position of the subject vehicle 1 is estimated (S115), and it may be possible to generate the traveling track by storing the estimated new traveling position (S111 in FIG. 4).

Next, after the traveling position is outputted to the driving assist apparatus 200 (S112), it is determined whether the driving ends (S113).

Consequently, the process returns to the start of the traveling position detection process and the outputs of the vehicle speed sensor and the azimuth sensor are acquired again (S101 in FIG. 3) when the driving continues (S113: no). By contrast, the traveling position detection process as shown in FIG. 3 and FIG. 4 ends when the driving ends (S113: yes).

As explained above in detail, in the traveling position detection process of the embodiment, it may be possible to decide the traveling position of the subject vehicle 1 on the road based on the offset position to the extracted lane marking when the lane marking can be extracted from the road image. It may be possible to estimate the traveling position of the subject vehicle 1 on the road based on the traveling speed and the traveling direction of the subject vehicle 1 and the map information even when the lane marking cannot be extracted from the road image.

Figure 10:
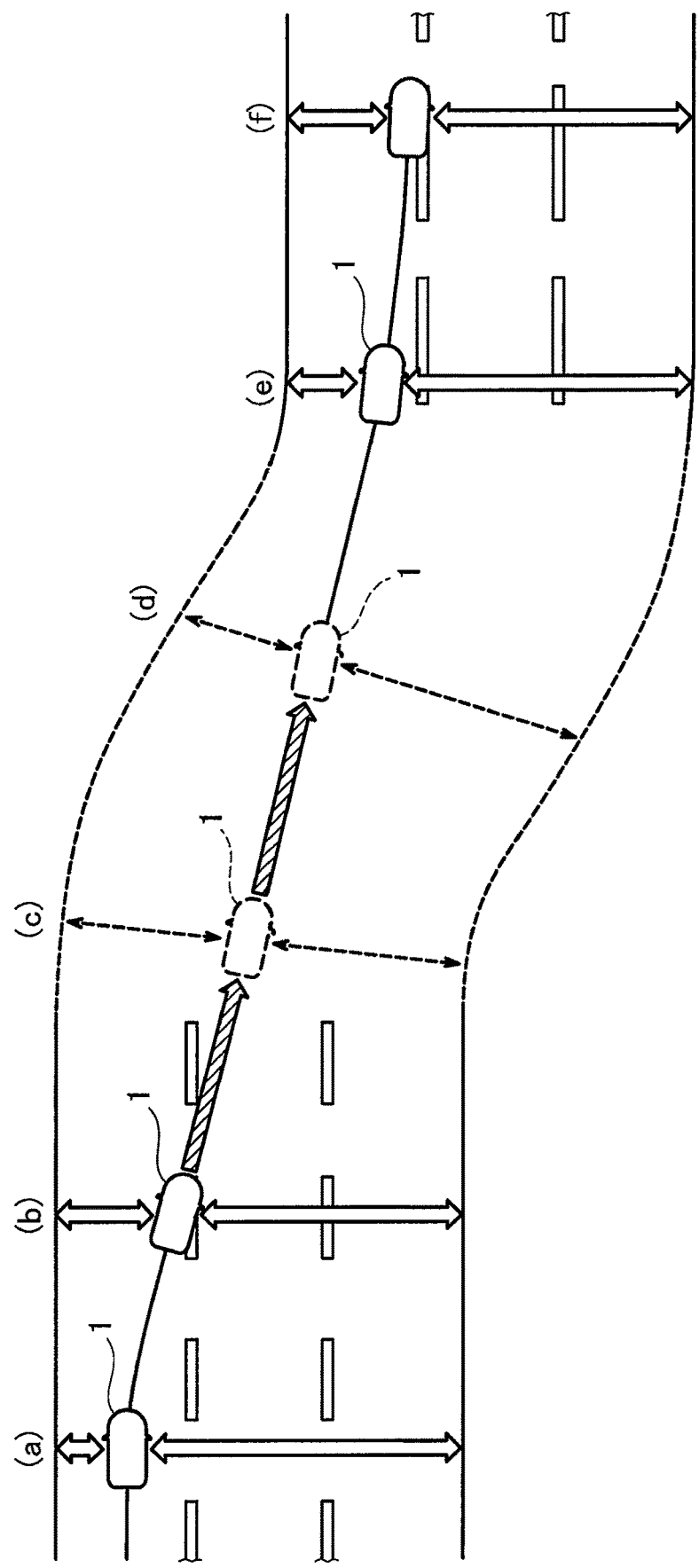
FIG. 10 is an explanatory view illustrating that the traveling position on the road is not lost even when there is a part where the lane marking cannot be distinguished on the road.

For example, a case of the traveling on a curve road as shown in FIG. 10 is considered. It may be possible to extract the lane marking from the road image when the subject vehicle 1 travels at a position (a) or a position (b) in FIG. 10. Therefore, it may be possible to decide the traveling position on the road of the subject vehicle 1 based on the offset position to the lane marking and the lane marking information stored in advance.

Nevertheless, it is impossible to extract the lane marking from the road image since the lane marking on the road disappears at a position (c). It is estimated that the subject vehicle 1 exists at a position moving by a distance of an arrow with a hatched line in the drawing based on the traveling position at the position (b) where the traveling position is decided in advance. A size and a direction of the arrow are decided based on the traveling speed and the traveling direction of the subject vehicle 1. The estimated position of the subject vehicle 1 and the map information stored in advance (that is, the route information and the lane marking information) are combined. It may be possible to estimate the traveling position of the subject vehicle 1 at the position (c) as shown by the broken line in FIG. 10.

Similarly, the lane marking on the road with respect to a position (d) disappears. It may be possible to estimate the traveling position with respect to the position (d) based on the estimated traveling position with respect to the position (c). In a case where the traveling position of the subject vehicle 1 is estimated in this way, it may be possible to provide the detailed driving assist such as instructing the traveling lane change before turning right or left even when the lane marking on the road disappears or it may be difficult to be recognized.

After that, it may be possible to decide the traveling position of the subject vehicle 1 on the road based on the lane marking information and the offset position to the extracted lane marking since the lane marking can be extracted from the road image at the position (e) and the position (f).

The traveling positions at the position (a), the position (b), the position (e), and the position (f) are the actual traveling position obtained from the road image. By contrast, the traveling positions at the position (c) and the position (d) include an error since being a mere estimation based on the traveling speed and the traveling direction. Thus, new traveling positions are repeatedly estimated based on the traveling position including the error, the error is gradually accumulated, and it may be difficult to correctly estimate the traveling position.

However, as exemplified in FIG. 10, the traveling position is accurately decided based on the road image before starting the estimation of the traveling position. In a case of some distance, a large error is not accumulated when the new traveling position is estimated based on the estimated traveling position. In addition, in a case where the lane marking can be extracted from the road image, the correct traveling position is immediately decided even when the accumulated error becomes large.

Therefore, it may be possible to decide or estimate the traveling position of the subject vehicle 1 on the road with sufficient accuracy unless a situation occurs, the situation including a state that the lane marking cannot be extracted continues for a long time, for example, such as traveling in state that the onboard camera 14 gets broken.

There is an area where the lane marking cannot be drawn on an actual road. For example, the lane marking cannot be drawn due to sharply increase of the number of the traveling lanes immediately before a tollgate of a highway as exemplified in FIG. 11. Similarly, the lane marking cannot be drawn due to sharply decrease of the number of the traveling lanes even at a portion immediately after passing a tollgate of a highway.

It is impossible to find the traveling position of the subject vehicle 1 by extracting the lane marking from the road image in the area where the lane marking cannot be drawn.

However, the traveling position detection apparatus 100 of the embodiment may be possible to find the traveling position on the road even when the lane marking cannot be extracted as described above. Therefore, it may be possible to find the traveling position of the subject vehicle 1 even in the area where the lane marking cannot be drawn.

Figure 11:
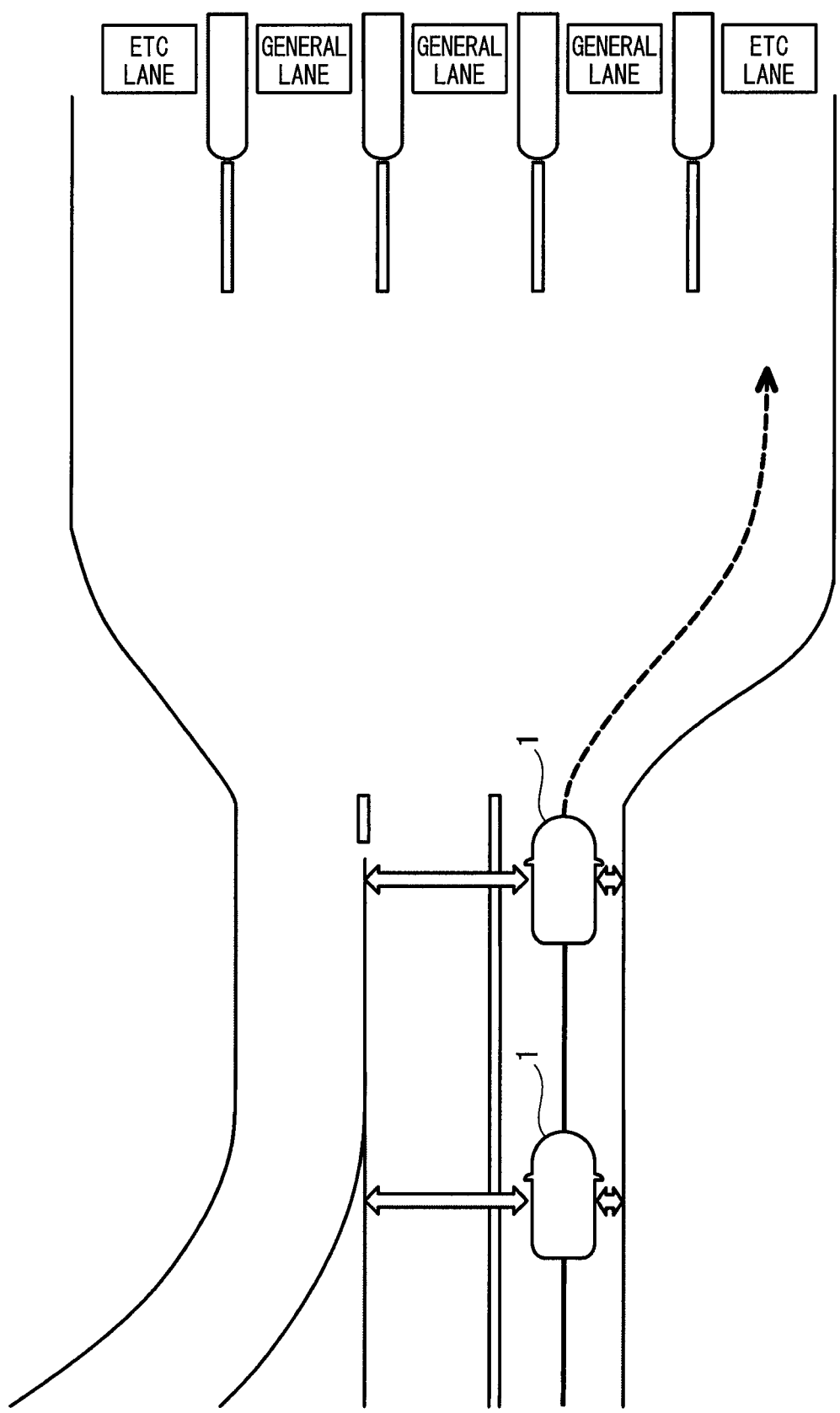
FIG. 11 is an explanatory view illustrating that the traveling position on the road is kept to be tracked even when a range where the lane marking cannot be shown on the road exists.

For example, the subject vehicle 1 travels while deciding the traveling position by using the lane marking extracted from the road image in the area where the lane marking is drawn on the road, as shown in FIG. 11. The subject vehicle 1 travels while estimating the traveling position of the subject vehicle 1 by using the traveling speed and the traveling direction or the map information when entering an area where the lane marking does not exist. Thereby, it may be possible to provide the driving assist that leads the subject vehicle 1 to an appropriate tollgate as shown in drawing by a broken line, for example.

C. Modification

In the traveling position detection apparatus 100 of the embodiment as described above, some modifications can be considered. Hereinafter, in regard to the modification, a difference point from the embodiment will be simply explained mainly. In an explanation with respect to the modification, the explanation of a common part with the embodiment will be omitted by applying an identical reference to the embodiment.

C-1. First Modification

In the embodiment as described above, it is explained that the lane marking distantly positioned from the subject vehicle 1 is extracted by photographing the road image ahead of the subject vehicle 1. However, the road image of the peripheral of the subject vehicle 1 is photographed and the lane marking may be extracted from the obtained road image.

Figure 12:
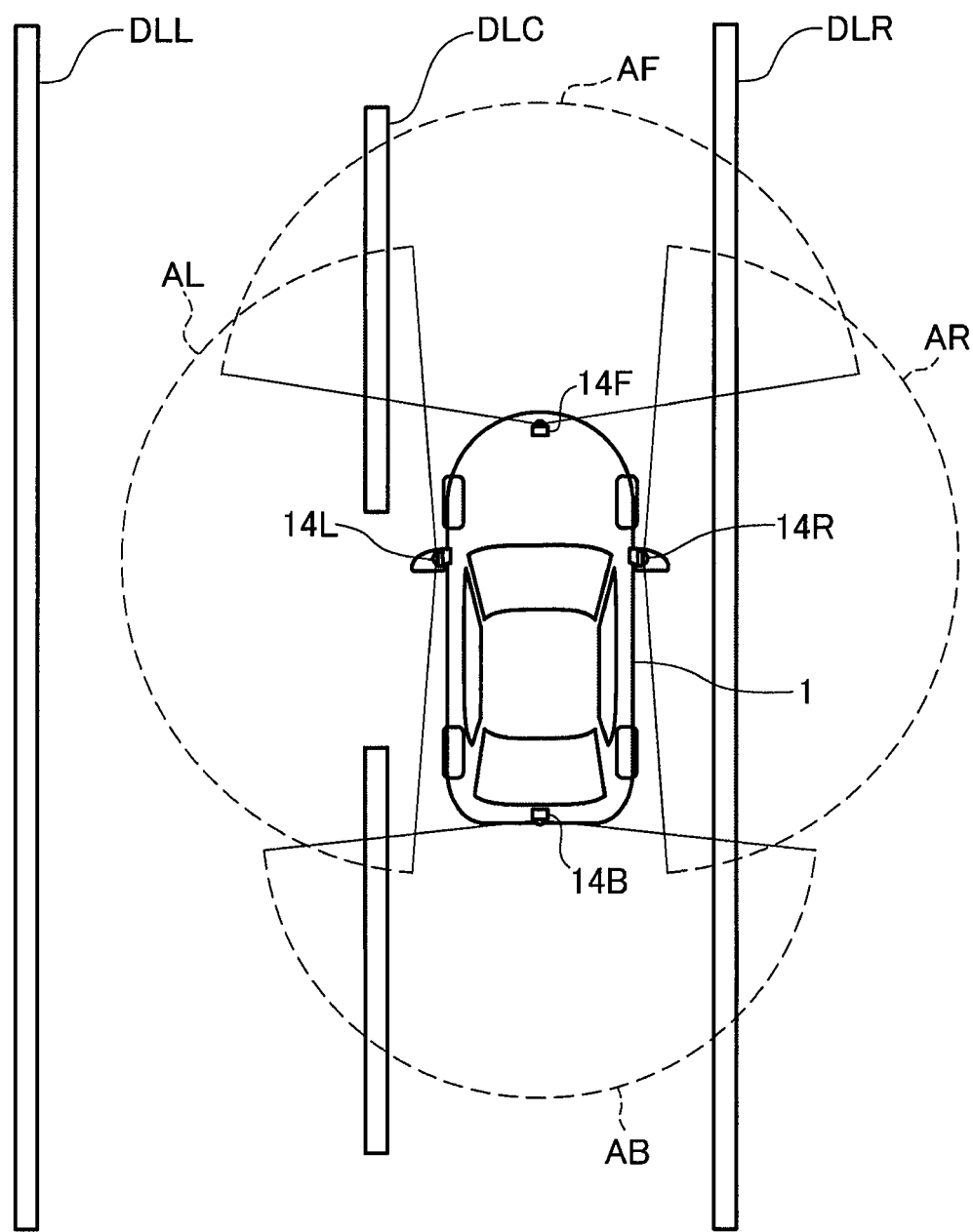
FIG. 12 is an explanatory view exemplifying a subject vehicle 1 of a first modification installed with an onboard camera photographing a peripheral road.

For example, the subject vehicle 1 exemplified in FIG. 12 includes four onboard cameras photographing the road image of the peripheral of the subject vehicle 1. A front onboard camera 14F mounted on the front of the subject vehicle 1 photographs a road in a peripheral area AF in a front side of the subject vehicle 1. A rear onboard camera 14B mounted on a back of the subject vehicle 1 photographs a road in a peripheral area AB in a back side of the subject vehicle 1. A left onboard camera 14L mounted on a left of the subject vehicle 1 photographs a road in a peripheral region AL in a left side of the subject vehicle 1. A right onboard camera 14R mounted on a right of the subject vehicle 1 photographs a road in a peripheral region AR in a right side of the subject vehicle 1.

Though the subject vehicle 1 can extract the lane markings in the right and the left sides of the subject vehicle 1 since the subject vehicle 1 obtains the road image of the peripheral of the subject vehicle 1, it may be difficult to always extract the lane marking over the side.

For example, it is supposed that the subject vehicle 1 shown in FIG. 12 travels on the traveling lane in the right side of two traveling lanes on the road. In this case, it is possible to extract a lane marking DLC in a central of the road and a right-end lane marking DLR on the road by analyzing any road image of the front onboard camera 14F or the rear onboard camera 14B. It is possible to extract the lane marking DLC from a road image of the left onboard camera 14L and to extract the lane marking DLR from a road image of the right onboard camera 14R.

By contrast, a left-end lane marking DLL on the road is not in the any road image, and it is difficult to extract the left-end lane marking DLL on the road from the road image.

However, even in the case, when the number of the traveling lanes and a type of the lane marking are stored as the lane marking information, it may be possible to decide or estimate the traveling position on the road similarly to the embodiment explained above.

Figure 13:
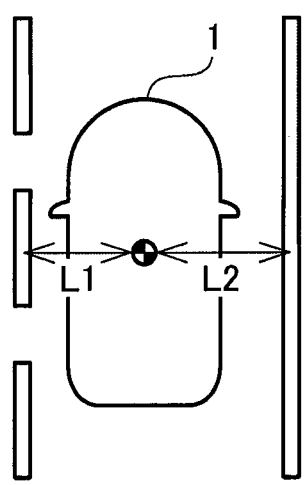
FIG. 13 is an explanatory view illustrating how the subject vehicle 1 of the first modification extracts the lane marking on the peripheral road and thereby decides the traveling position.
Figure 13:
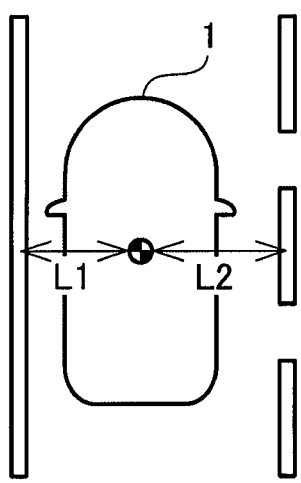
Figure 13:
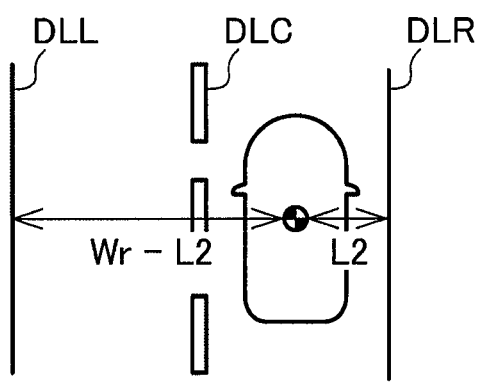
Figure 13:
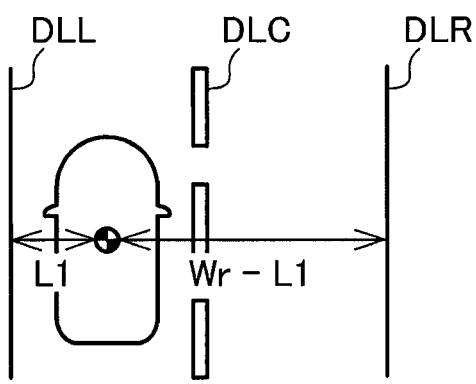

For example, it is supposed that a broken-line lane marking (that is, an intermissive lane marking) are extracted in the left side of the subject vehicle 1 and a solid-line lane marking (that is, a continuing lane marking) is extracted in the right side of the subject vehicle 1, as shown in a part (a) of FIG. 13. In this case, it may be possible to decide the traveling position on the road based on the lane marking information, when information that, for example, the number of the traveling lanes is two and the central lane marking is a broken line and the left and right lane markings are solid line (referring to FIG. 12) is stored as the lane marking information. That is, it may be possible to determine that the subject vehicle 1 travels on a right side traveling lane as shown in a part (b) of FIG. 13, according to the lane marking information, since the lane marking in the left side of the subject vehicle 1 is broken line and the lane marking in the right side is solid line.

It may be possible to decide the traveling position of the subject vehicle 1 by using a combination of the distance L2 with the lane marking information since the distance L2 to the right-side lane marking DLR is found from the road image. It may be possible to calculate a distance to the left-end lane marking DLL on the road as Wr-L2 when the road width Wr is acquired from the lane marking information, for example.

It may be possible to determine that the subject vehicle 1 travels in the traveling lane in the left side as shown in a part (d) of FIG. 13 when the a lane marking detected in the left side of the subject vehicle 1 is solid line and a lane marking detected in the right side of the subject vehicle 1 is a broken line as shown in a part (c) of FIG. 13.

It may be possible to decide the traveling position of the subject vehicle 1 since the distance L1 to the left-side lane marking DLL is founded from the road image. For example, it may be possible to calculate a distance to the right-side lane marking DLR on the road based on Wr-L1.

Figure 14:
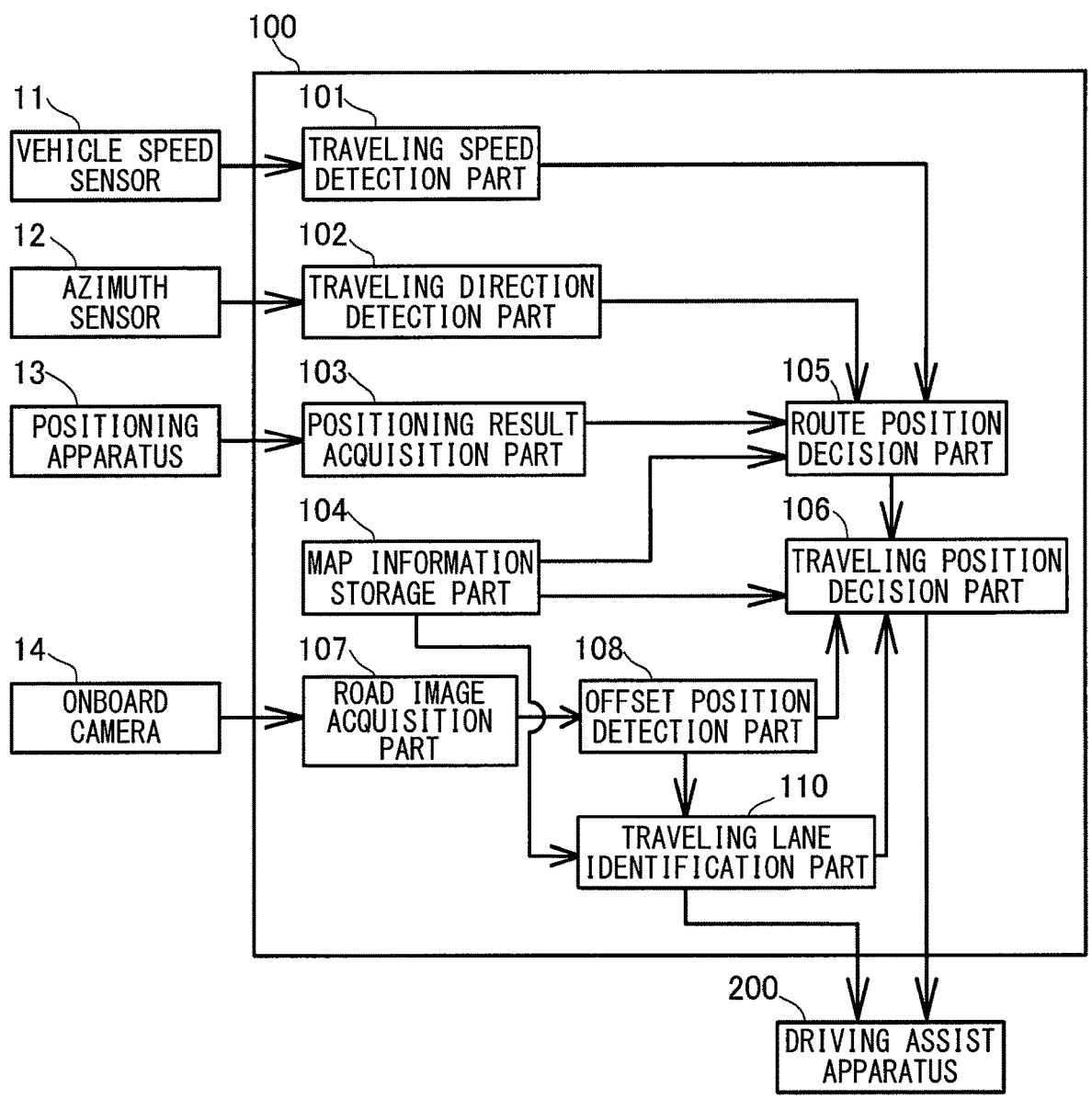
FIG. 14 is a block diagram showing a schematic internal structure of the traveling position detection apparatus of the first modification.

FIG. 14 shows a schematic internal structure of the traveling position detection apparatus 100 of the first modification enabling that. The traveling position detection apparatus 100 of the first modification shown in FIG. 14 is greatly different from the traveling position detection apparatus 100 described above by using FIG. 2 at a point of including a traveling lane identification part 110 identifying the traveling lane based on the lane marking information instead of a traveling lane decision part 109 deciding the traveling lane from the traveling position.

In the traveling position detection apparatus 100 of the first modification, an offset position detection part 108 detects a kind of the lane marking and outputs the obtained offset position and the kind of the lane marking to the traveling lane identification part 110 when the offset position detection part 108 extracts the lane marking from the road image and detects the offset position.

The map information storage part 104 stores a kind of the lane marking as the lane marking information.

After the traveling lane identification part 110 identifies the traveling lane where the subject vehicle 1 travels based on the kind of the obtained lane marking and the obtained lane marking read out from the map information storage part 104, outputting to the traveling position decision part 106 and the driving assist apparatus 200.

Similarly to the above described embodiment, the traveling position decision part 106 considers route position received from the route position decision part 105, the map information read out from the map information storage part 104, the offset position received from the offset position detection part 108, and additionally also the traveling lane received from the traveling lane identification part 110. The traveling position decision part 106 decides the traveling position on the road, and thereafter outputs to the driving assist apparatus 200.

In the first modification, the kind of the lane marking (for example, the lane marking is a broken line, a solid line, or the like) is detected in addition to the position of the lane marking when the lane marking is extracted from the road image. The traveling lane where the subject vehicle 1 travels is identified by collating the kind of the detected lane marking with the kind of the lane marking stored in the lane marking information. It may be possible to decide by identifying the traveling lane, the traveling position on the road based on the offset position to the detected lane markings in the left and right sides of the subject vehicle 1 and the information with respect to the width of the traveling lane stored in the lane marking information.

In a case where the traveling position on the road can be detected, it may be possible to estimate the traveling position on the road similarly to the embodiment described above even when the lane marking cannot be extracted from the road image.

The kind of the lane marking is not limited to the broken-line lane marking or the solid-line lane marking, and the other characteristic may be stored.

Furthermore, a paint color of a character, a figure, a road surface or the like may be stored as the lane marking information. The subject vehicle 1 may identify the traveling lane where the subject vehicle 1 travels based on the information when these information are extracted from the road image.

C-2. Second Modification:

In the embodiment and the first modification described above, it is explained that it may be possible to decide the route position of the subject vehicle 1 (that is, the position except for the width direction of the road) with a sufficient accuracy by using the combination of the traveling speed, the traveling direction, the positioning result, and the map information of the subject vehicle 1. Actually, it may be possible to decide the route position with sufficient accuracy by matching the traveling track obtained by accumulating the traveling speed or the traveling direction of the subject vehicle 1 to the shape of the road when the subject vehicle 1 travels on the road of the characteristic shape.

Furthermore, it may be possible to obtain information with respect to the size of the error included in the decided route position from a correction amount at when the traveling track of the subject vehicle 1 is matched to the shape of the road. For example, it is supposed that the correction amount when matching the traveling track of the subject vehicle 1 with the shape of the road is sufficiently small, the route position does not actually change greatly without performing matching. In this case, the route position is decided with the sufficient accuracy. Thus, it may be considered that the error included in the decided route position is low. Adversely, when the correction amount is great, needed accuracy is somehow secured by matching. However, it is considered that the decided route position potentially includes a large error.

In addition, the matching cannot be always provided since the shape of the road is required to be characteristic in order to match the traveling track of the subject vehicle 1 to the shape of the road. Accordingly, a state that the subject vehicle 1 travels without correcting the position by the matching based on the shape continues when a straight or a gentle carve continues for a long distance. It is considered that the error becomes large.

In the technology deciding the route position of the subject vehicle 1 by matching the traveling track of the subject vehicle 1 to the shape of the road, an accuracy of the route position may deteriorate depending on a condition. In a state that the accuracy of the route position deteriorates, when the position of the subject vehicle 1 in the width direction of the road is decided based on the lane marking extracted from the road image, the accuracy of the route position may further deteriorate in some cases. For example, this is a following case.

Figure 15:
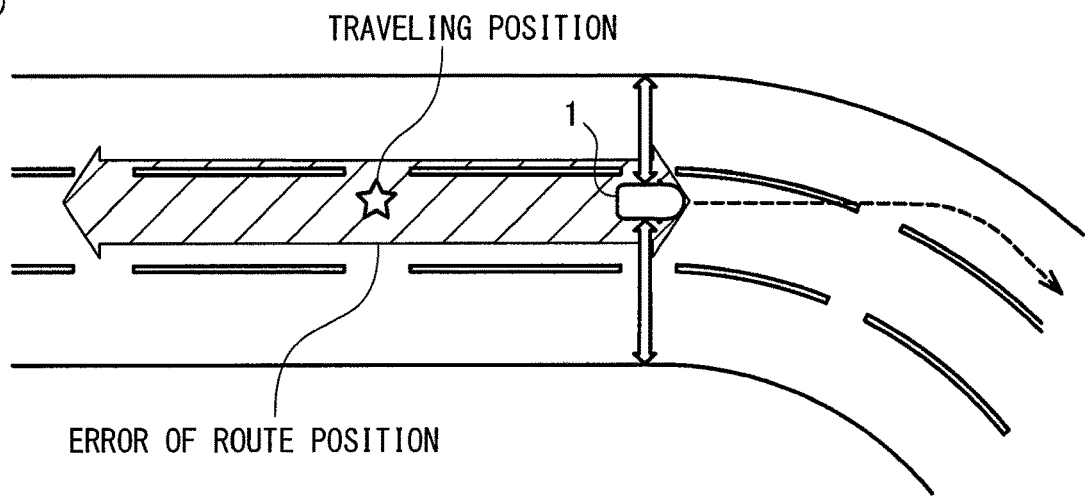
FIG. 15 is an explanatory view about a case where a road shape varies from a straight to a curve within a range of an error of a pathway position.
Figure 15:
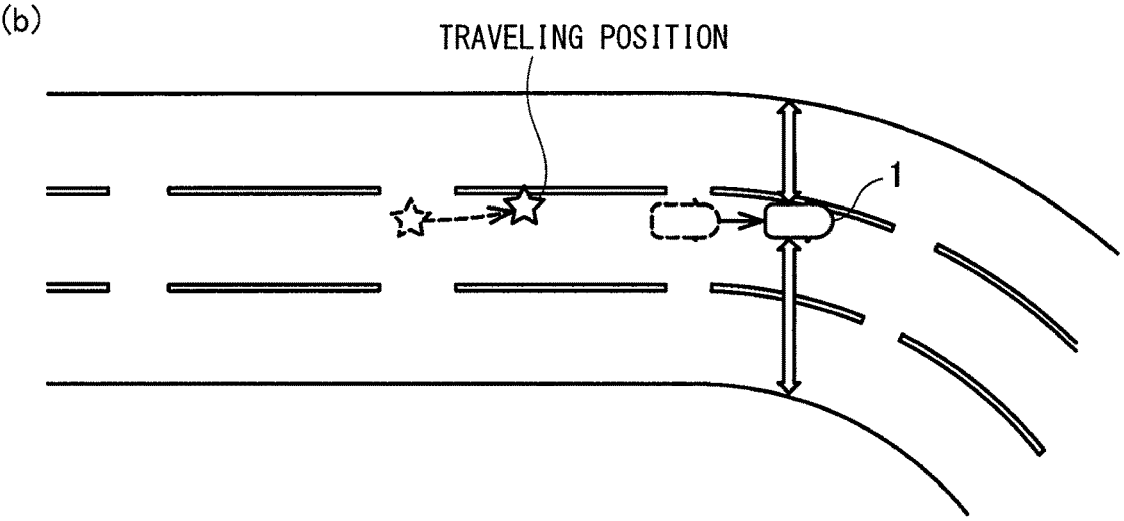
Figure 15:
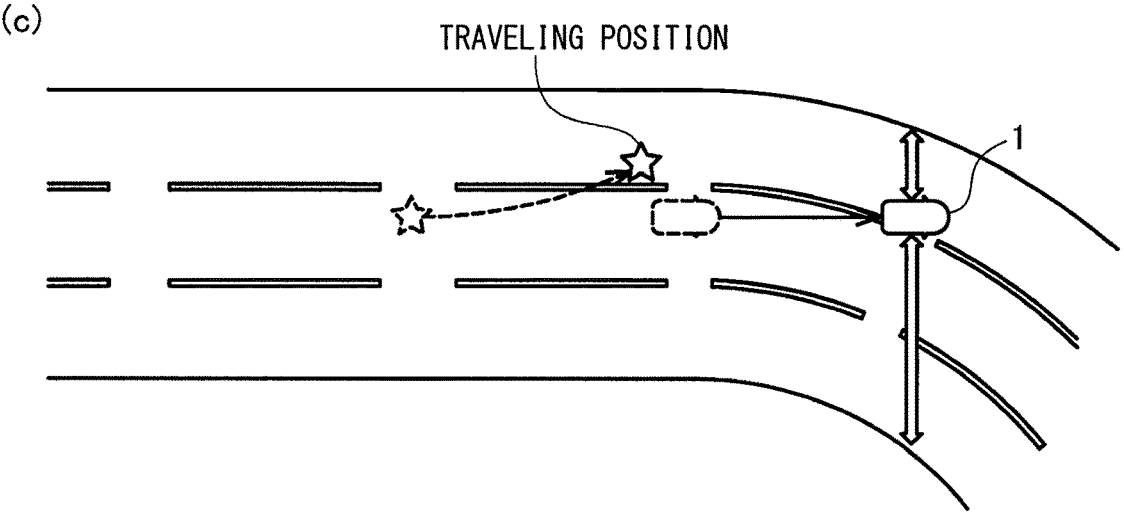

FIG. 15 exemplifies a case where the subject vehicle 1 travels on the road coming to the curve from the straight. The traveling position of the subject vehicle 1 (that is, a position additionally added with the width direction on the road to the route position) is shown by a star sign and the traveling position is distinguished from the actual position of the subject vehicle 1 in the following drawing since it is supposed that the route position of the subject vehicle 1 is different from the actual position at which the subject vehicle 1 exists. Thus, it is regarded that the position showing the subject vehicle 1 in the drawing shows a position where the subject vehicle 1 actually exists. The position in the width direction on the road is decided by extracting the lane marking from the road image, as described above.

In an example shown in a part (a) of FIG. 15, the subject vehicle 1 is regarded to travel in a straight part immediately before coming to the curve, according to the route position of the subject vehicle 1 decided by using the traveling speed, the traveling direction, the positioning result and the map information. Furthermore, the subject vehicle 1 exists in the central of the road according to the information of the lane marking where the subject vehicle 1 exists in the left or right of the subject vehicle 1, as shown by the white arrow in the drawing. Hence, the central position of the road is decided as shown by the star sign in the drawing.

As described above, the size of the error included in the route position may increase or decrease. It is supposed that the error happens to become large and the actual subject vehicle 1 travels in a portion coming to the curve after a straight portion ends, as shown in the part (a) of FIG. 15. In this case, it is considered that the subject vehicle 1 goes straight part of the curve and performs the traveling lane change to the left side, as shown by the broken arrow in the drawing.

A part (b) of FIG. 15 shows a state that the subject vehicle 1 goes straight from the position shown in the part (a) of FIG. 15. As shown by the white arrow in the drawing, according to the information of the lane marking existing in the left or the right sides of the subject vehicle 1, the subject vehicle 1 is regarded to travel at a position in the left of the center on the road. Hence, the traveling position of the subject vehicle 1 is decided based on the information, and the traveling position of the subject vehicle 1 is decided to a position slightly moving to a left side compared with the case of the part (a) of FIG. 15.

When the subject vehicle 1 further goes straight ahead so as to be a state shown in a part (c) of FIG. 15, according to the information of the lane markings existing on the left and right sides of the subject vehicle 1, it is considered that the subject vehicle 1 travels a position which largely deviates toward the left side of the road. Therefore, when the traveling position of the subject vehicle 1 is decided based on the information, it is decided to be a position further closer to the left side.

In the example shown in FIG. 15, the traveling position of the subject vehicle 1 is erroneously detected so that the subject vehicle 1 gently turns left as shown by the broken line in the drawing, in spite of that the subject vehicle 1 actually goes straight on the road. In this case, the traveling position of the subject vehicle 1 is decided based on the position of the lane marking extracted from the road image. A situation occurs, the situation being that the subject vehicle 1 is erroneously detected so as to turn left (or turn light) in spite of that the subject vehicle 1 actually goes straight. The outputs of the vehicle speed sensor 11 and the azimuth sensor 12 are corrected based on the result. An error of the route position decided after that becomes large.

Furthermore, when the lane marking is blurred in the middle of the curve, a traveling lane may be erroneously outputted. That is, it is supposed that the lane marking of the road disappears near a position where the subject vehicle 1 starts to turn right along a curve of the road (as shown by an arrow of the solid line) after the subject vehicle 1 ends to move to the left traveling lane, as exemplified in a part (a) of FIG. 16.

As described above by using FIG. 3, since the lane marking disappears and the lane marking in the road image is difficult to be extracted (S108: no), the subject vehicle 1 travels while estimating the traveling position on the road based on the movement distance and the movement direction of the subject vehicle 1 (S114, S115).

Figure 16:
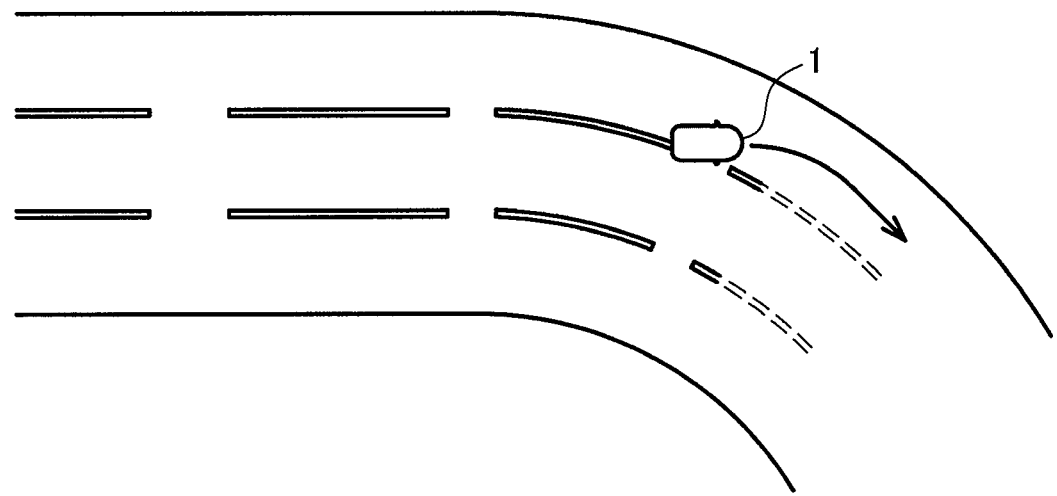
FIG. 16 is an explanatory view about a case where the road shape varies from the straight to the curve within the range of the error of the pathway position and also the lane marking on the road is blurred.
Figure 16:
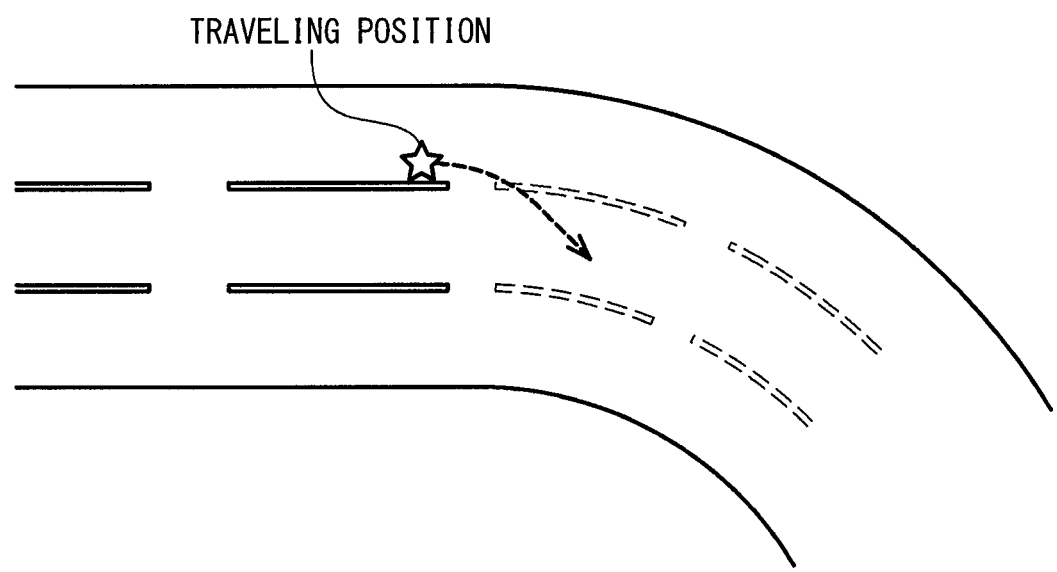

However, according to the traveling position decided on the map, it is considered that the subject vehicle 1 travels at a position changing from a straight portion to the curve, as shown in a part (b) of FIG. 16. Actually, for the traveling position detection apparatus 100, it is a similar condition that the lane marking disappears at the start of the curve as shown in the part (b) of FIG. 16 though the lane marking disappears in the middle of the curve as shown in the part (a) of FIG. 16. Consequently, a traveling track from the traveling position as shown by the star sign in the drawing is shown by the arrow of the broken a line in the drawing based on the movement distance and the movement direction of the subject vehicle 1, and thereby the traveling position on the road is estimated.

In regard to the traveling track, it is clear that an accurate track is generated by comparing the arrow of the soling line shown in the part (a) of FIG. 16 with the arrow of the broken line shown in the part (b) of FIG. 16. However, as shown in the part (b) of FIG. 16, when the traveling position is estimated from the traveling track, it is erroneously estimated so that the subject vehicle 1 travels in the center of the road.

In the examples shown in FIG. 15 and FIG. 16, the case is explained, where the subject vehicle 1 actually travels on the curve in spite of that the subject vehicle 1 travels the straight portion according to the traveling position decided on the map. By the contrast, the similar explanation is applied to a case of actually traveling at the straight portion though the subject vehicle 1 travels on the curve at the traveling position decided on the map. In the examples shown in FIG. 15 and FIG. 16, the case is explained, where a position that the subject vehicle 1 actually travels is in front of the traveling position decided on the map. However, the similar explanation is applied to a case where the position is in back of the traveling position decided on the map.

Figure 17:
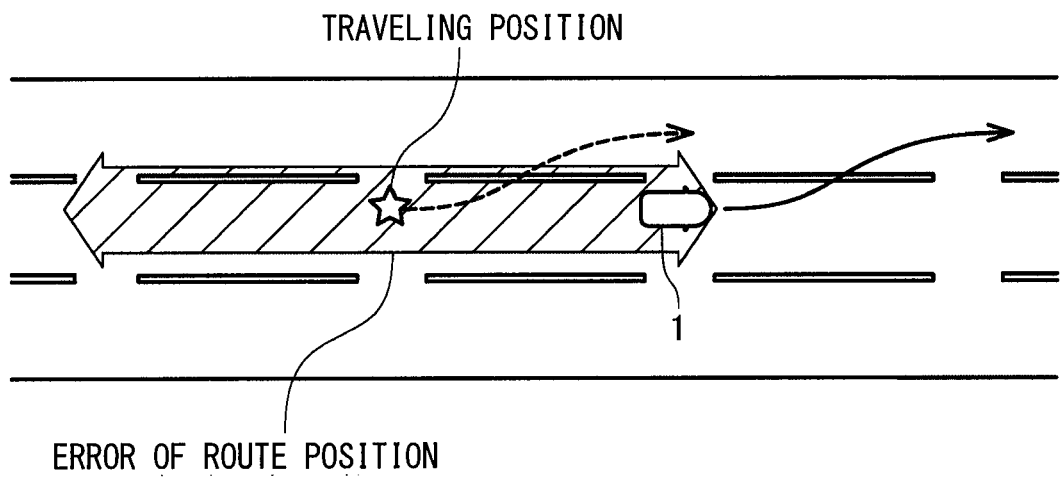
FIG. 17 is an explanatory view illustrating a case where the road shape within the range of the error of the pathway position is straight.

By contrast, the difficulty as described above does not occur when the subject vehicle 1 travels on a straight road. For example, in the example shown in FIG. 17, the road is straight though a large shift occurs, the large shift being between the traveling position of the subject vehicle 1 decided on the map and the position where the subject vehicle 1 actually travels. The subject vehicle 1 performs the traveling lane change to the left traveling lane, the traveling position shown by the star sign also performs the traveling lane change to the left traveling lane, and the difficulty described above does not occur.

Figure 18:
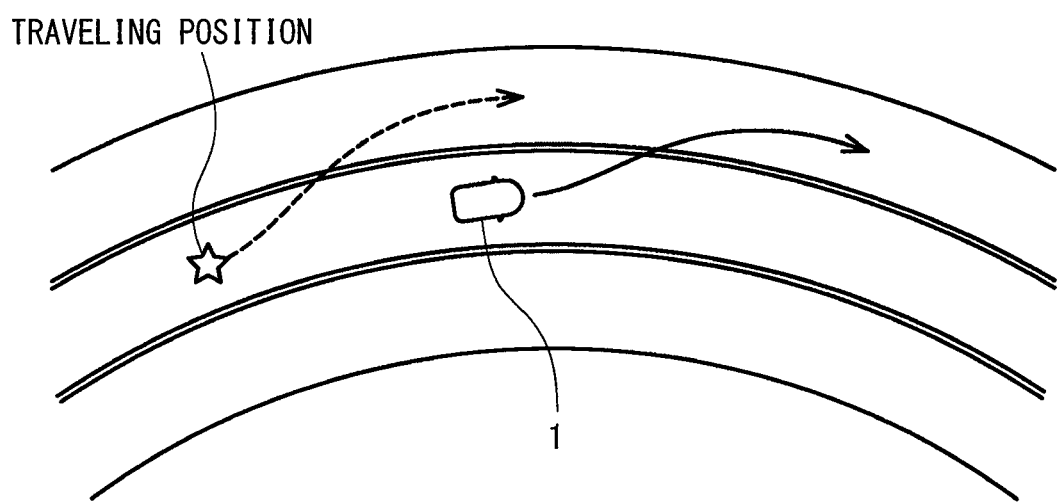
FIG. 18 is an explanatory view illustrating a case where the road shape within the range of the error of the pathway position is the curve.

The difficulty described above does not occur even when the subject vehicle 1 travels on the large curve. That is, in the example shown in FIG. 18, the large shift occurs, the large shift being between the traveling position of the subject vehicle 1 shown by the star sign and the position where the subject vehicle 1 actually travels. However, the subject vehicle 1 performs the traveling lane change to the left traveling lane, the traveling position shown by the star sign also performs the traveling lane change to the left traveling lane, and the difficulty described above does not occur.

The difficulty described above, that is, is that the traveling position of the subject vehicle 1 includes the position in the width direction of the road and is decided based on the lane marking extracted from the road image. The accuracy of the route position may deteriorate furthermore. The difficulty is considered to occur when a bent shape of the road at the traveling position of the subject vehicle 1 decided on the map is different from a bent shape of the road at the position where the subject vehicle 1 actually travels.

Here, the bent shape of the road is a bent aspect of the road roughly categorized such as straight, curve, right curve, left curve, large curve, and small curve. For example, in regard to the straight or the curve, it is possible to determine as straight in a case where a radius of curvature exceeds a predetermined value, and it is possible to determine as curve except for the case. Even when the right curve and the left curve continue, it may be possible to determine as on the straight in the case where the radius of the curvature of each curve exceeds the predetermined value. Furthermore, in a case where the two curves continue, it may be possible to determine that the large curve and the small curve continue when a difference between the radiuses of the curvatures of each curve exceeds a predetermined threshold. The bent shape of the road is the bent aspect of the road roughly categorized in this way.

As described above, it may be possible to estimate the size of the error of the route position when the route position of the subject vehicle 1 is decided by using the traveling speed, the traveling direction, the positioning result, and the map information of the subject vehicle 1. Thus, it is considered that the traveling position of the subject vehicle 1 is decided based on the lane marking extracted from the road image and the accuracy of the route position may decrease more, when the portion where the bent shape of the road varies exists within a range of the error of the route position.

The traveling position detection apparatus 100 of the second modification detects the subject vehicle 1 as described below.

Figure 19:
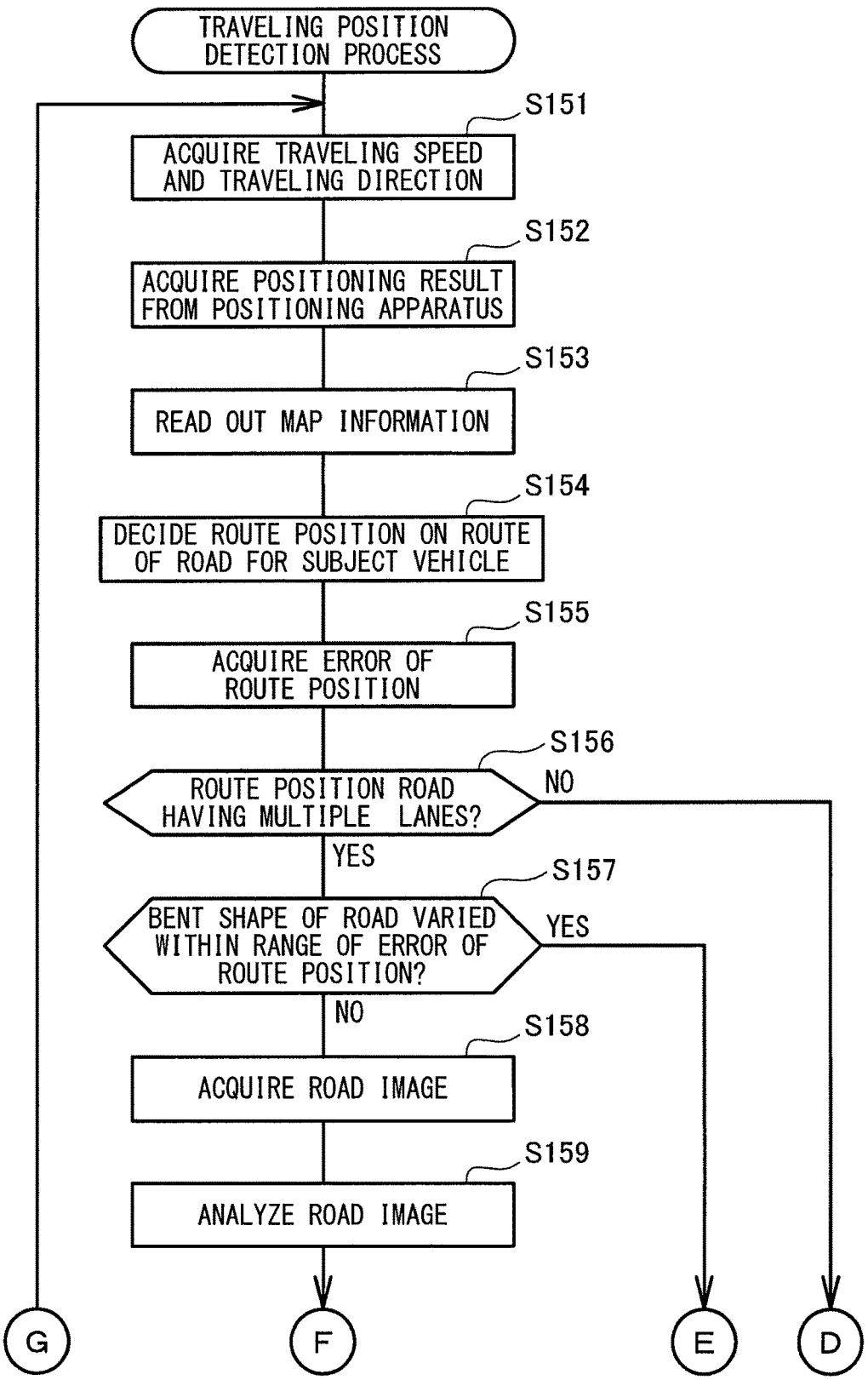
FIG. 19 is a flowchart showing a first part of a traveling position detection process of a second modification.
Figure 20:
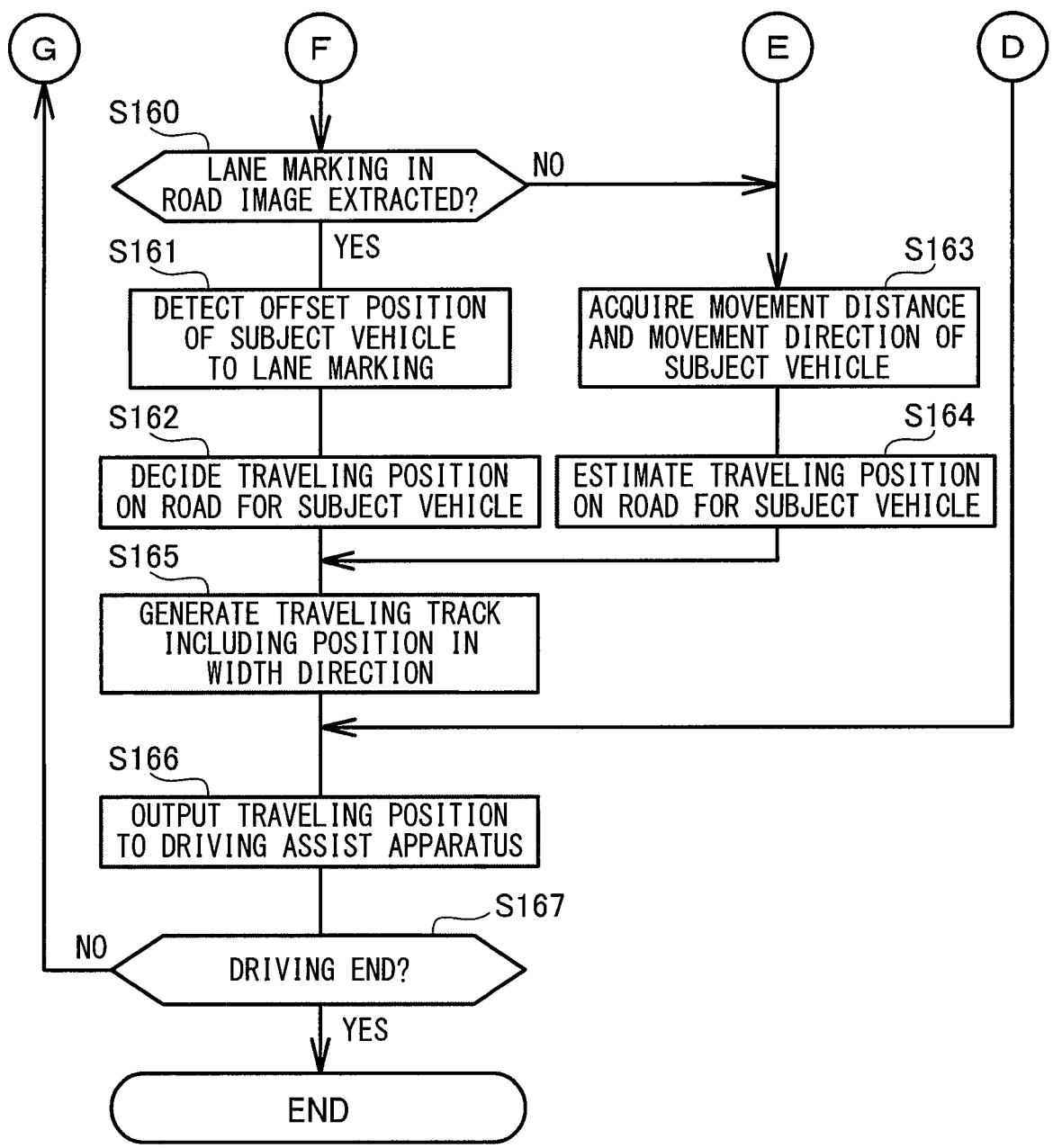
FIG. 20 is a flowchart showing a second part of the traveling position detection process of the second modification.

FIG. 19 and FIG. 20 show a flowchart of the traveling position detection process of the second modification. The traveling position detection process of the second modification is largely different from the traveling position detection process of the embodiment described above by using FIG. 3 and FIG. 4 at the following point. The point is that the traveling position in the width direction of the road is not decided by using information of the lane marking extracted from the road image even when the road shape varies within the range of the error of the route position.

In the traveling position detection process of the second modification, the traveling speed and the traveling direction of the subject vehicle 1 is acquired based on the outputs of the vehicle speed sensor 11 and the azimuth sensor 12 similarly to the embodiment described above (S151). Next, the positioning result including the positioning position of the subject vehicle 1 is acquired from the positioning apparatus 13 (S152). Furthermore, the map information in the peripheral of the subject vehicle 1 is acquired based on the positioning position of the subject vehicle 1 (S153).

After that, the route position of the subject vehicle 1 on the map is decided based on the traveling speed, the traveling direction, the positioning result, and the map information of the subject vehicle 1 as acquired above (S154).

In the traveling position detection process of the second modification, the size of the error included in the decided route position is acquired when the route position is decided (S155). That is, the traveling track is obtained by accumulating the traveling speed or the traveling direction of the subject vehicle 1, the traveling track is matched to the shape of the road, and the correction amount of the route position occurs at when the traveling track is matched to the shape of the road. It may be possible to estimate the size of the error included in the route position based on the correction amount of the route position. Furthermore, it may be possible to estimate an increase amount of the error based on the traveling distance following to the previous matching. In S155, the size of the error included in the route position is calculated by the method.

Furthermore, it is determined whether the route position of the road is plural traveling lanes based on the lane marking information of the map information (S156). Consequently, when the road of the route position is not plural traveling lanes (S156: no), it is determined that the position in the width direction is unnecessary to be decided and the route position is outputted to the driving assist apparatus (S166 in FIG. 20).

By the contrast, when the road of the route position is plural traveling lanes (S156 in FIG. 19: yes), it may be preferable that the driving assist is provided on a basis of the traveling lane where the subject vehicle 1 travels. In order to do that, necessity of detecting the position in the width direction on the road occurs. The position in the width direction is decided based on the position of the lane marking extracted from the road image since the position in the width direction on the road is not understood at the route position decided based on the traveling speed, the traveling direction, the positioning result, and the map information of the subject vehicle 1.

However, it is considered that a possibility of more decreasing the accuracy of the route position occurs by determining the traveling position of the subject vehicle 1 based on the lane marking extracted from the road image in the case where the bent shape of the road varies within the range of the error of the route position, as described above by using FIG. 15 to FIG. 18.

In the traveling position detection process of the second modification, it is determined whether the bent shape of the road varies within the range of the error of the route position (S157). The size of the error of the route position is acquired in S155 in advance. It may be possible to easily determine whether the bent shape of the road varies within the range of the error of the route position since the map information is already acquired in S153.

For example, in the case exemplified in FIG. 15, the road of the route position is straight. By contrast, a portion of the curve exists within the range of the error of the route position, and therefore the bent shape of the road varies. By contrast, for example, even in the case exemplified in FIG. 17 or FIG. 18, the bent shape of the road does not vary within the range of the error of the route position.

Consequently, in a case where it is determined that the bent shape of the road does not vary within the range of the error of the route position (S157: no), the road image of the front or side of the subject vehicle 1 is acquired (S158). The lane marking is extracted by analyzing the road image (S159).

After that, it is determined whether the lane marking in the road image can be extracted (S160 in FIG. 20). When the lane marking can be extracted (S160: yes), the offset position of the subject vehicle 1 to the lane marking is detected (S161) similarly to the traveling position detection process of the embodiment described above. After the traveling position of the subject vehicle 1 including the position in the width direction of the road is decided (S162), the traveling track of the subject vehicle 1 on the road is generated by using the decided traveling position (S165).

By contrast, when the lane marking cannot be extracted from the road image (S160: no), firstly, the movement distance and the movement direction of the subject vehicle 1 is acquired (S163). The traveling position (that is, the route position and the position in the width direction on the road) is estimated based on the movement distance and the movement direction of the subject vehicle 1 (S164). That is, when the lane marking can be extracted from the road image (S162), the traveling position of the subject vehicle 1 is decided based on the extracted lane marking. The traveling position on the road is estimated by using the traveling speed and the traveling direction when the lane marking cannot be extracted (S164). The traveling position of the subject vehicle 1 is estimated (S164), and the traveling track is generated by storing the estimated new traveling position (S165).

In the above, the process is explained, the process being executed for, when it is determined that the bent shape of the road does not vary within the range of the error of the route position (S157: no), decide the route position of the subject vehicle 1 (S162) or estimating the traveling position of the subject vehicle 1 (S164), and generating the traveling track including the position in the width direction on the road (S165).

By contrast, when it is determined that the error of the route position varies within the range of the error of the route position (S157: yes), the traveling position of the subject vehicle 1 is decided based on the lane marking extracted from the road image, and the accuracy of the route position may decrease more, as described above by using the FIG. 15 to FIG. 18.

In this case (S157: yes), the movement distance and the movement direction of the subject vehicle 1 are acquired (S163) without executing a series of the process of acquiring the road image, analyzing the road image, and determining whether the lane marking can be extracted (S158 to S160). The traveling position is estimated based on the movement distance and the movement direction of the subject vehicle 1 (S164), and the traveling track is generated by using the estimated traveling position (S165).

After that, the new traveling position decided or estimated as above is outputted to the driving assist apparatus 200 (S166). In addition, traveling lane may be decided from the traveling position, and the traveling lane may be outputted.

After that, it is determined whether the driving ends (S167). When the driving does not end (S167: no), the process returns to the start of the traveling position detection process. The continuous series of the process described above starts after the outputs of the vehicle speed sensor and the azimuth sensor is acquired again (S151 in FIG. 19).

By contrast, when the driving ends (S167: yes), the traveling position detection process of the second modification ends.

In the traveling position detection process of the second modification explained above, the traveling position including the position in the width direction on the road is estimated based on the movement distance and the movement direction of the subject vehicle 1 without using the information of the lane marking extracted from the road image, when the error of the route position becomes large and the bent shape of the road varies within the range of the error. Therefore, it may be possible to avoid the situation that the traveling position of the subject vehicle 1 is decided to the erroneous position, as described above by using FIG. 15 or FIG. 16.

C-3. Third Modification:

In the second modification described above, it is explained that the traveling position is estimated based on the movement distance and the movement direction of the subject vehicle 1 instead of deciding the traveling position including the position in the width direction on the road by using the information of the lane marking extracted from the road image, when the bent shape of the road varies within the range of the error of the route position.

However, the traveling position may be decided by using the information of the lane marking extracted from the road image and information indicating that reliability of the decided traveling position is lowered may be outputted with the decided traveling position, when the bent shape of the road varies within the range of the error of the route position. Hereinafter, the third modification will be simply explained with a focus on a different point from the second modification.

Figure 21:
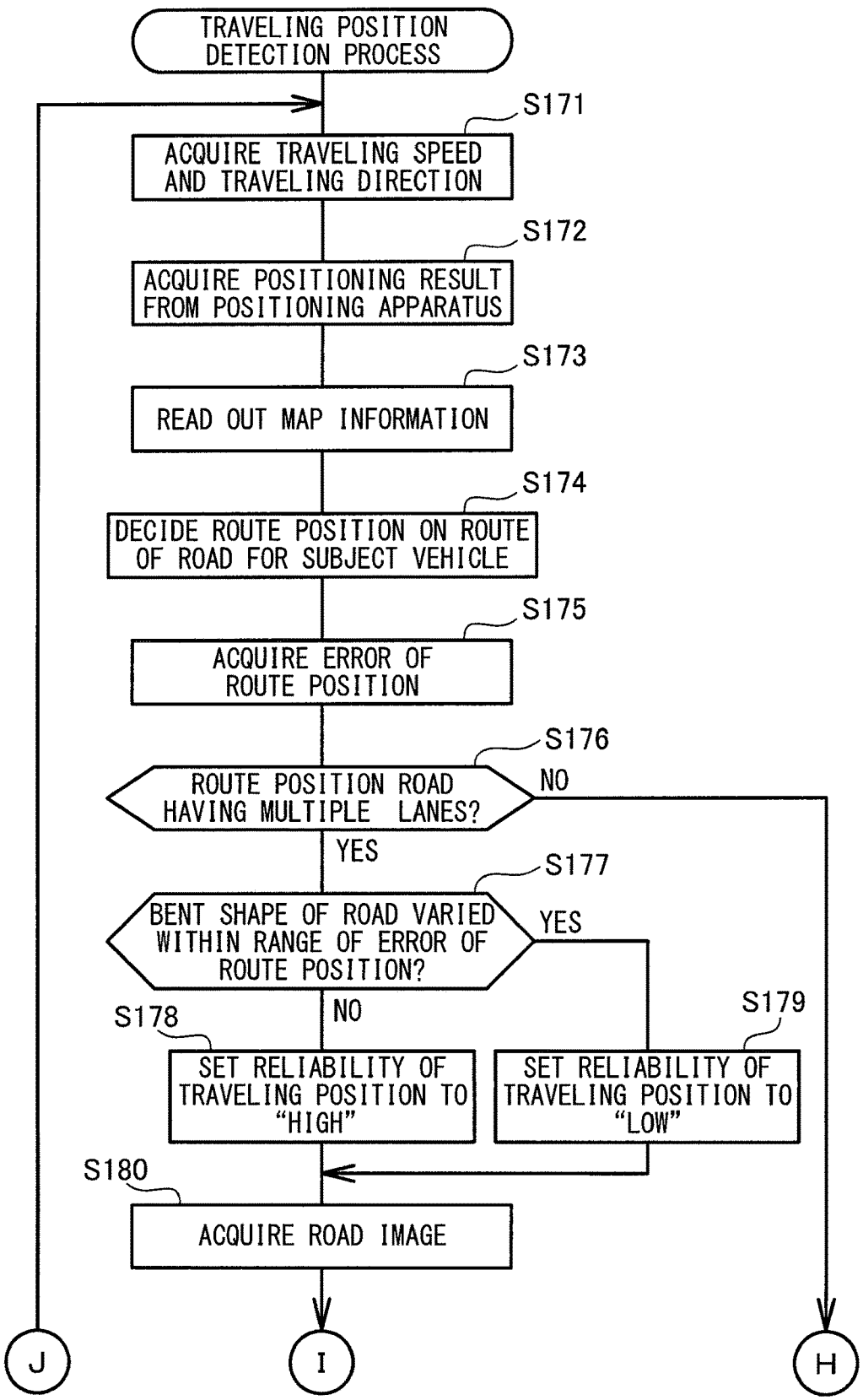
FIG. 21 is a flowchart showing a first part of a traveling position detection process of a third modification.
Figure 22:
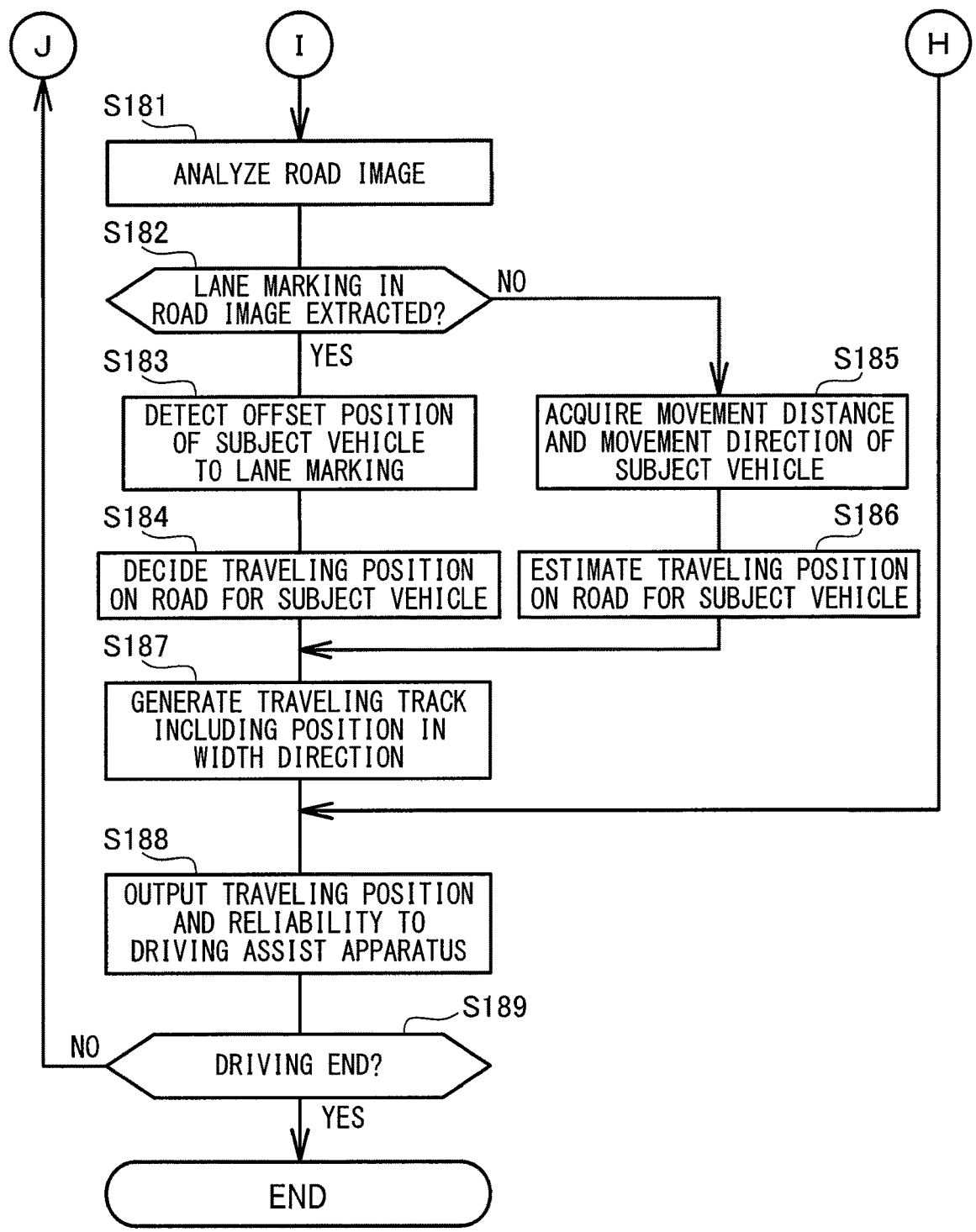
FIG. 22 is a flowchart showing a second part of the traveling position detection process of the third modification.

FIG. 21 and FIG. 22 show a flowchart of a traveling position detection process of the third modification. The traveling position detection process of the third modification is largely different from that of the second modification described above by using FIG. 19 and FIG. 20 at a point that the reliability of the traveling position is decided in addition to the traveling position in the width direction.

In the traveling position detection process of the third modification also, the traveling speed and the traveling direction of the subject vehicle 1 is acquired based on the output of the vehicle speed sensor 11 and the azimuth sensor 12 (S171). The positioning result including the positioning position of the subject vehicle 1 is acquired from the positioning apparatus 13 (S172). The map information in the peripheral of the subject vehicle 1 is acquired (S173) and the route position of the subject vehicle 1 on the map is decided (S174). At this time, the size of the error included in the decided route position is also acquired (S175).

After that, it is determined whether the road of the rout position is plural lanes based on the lane marking information of the map information (S176). When the road is not plural lanes (S176: no), it is determined that the determination of the position in the width direction is unnecessary, and the route position is outputted to the driving assist apparatus (S188 of FIG. 22).

When the road is plural lanes (S176 of FIG. 21: yes), it is determined whether the bent shape of the road varies within the range of the error of the route position (S177).

Consequently, when it is determined that the bent shape of the road does not vary within the range of the error of the route position (S177: no), the reliability of the traveling position is set to "high" (S178). By contrast, it is determined that the bent shape of the road varies within the range of the error of the route position (S177: yes), the reliability of the traveling position is set to "low" (S179).

Similarly to the traveling position detection process of the embodiment described above by using FIG. 3 and FIG. 4, the road image in the peripheral of the subject vehicle 1 is acquired (S180), and the lane marking is extracted by analyzing the road image (S181 of FIG. 22). That is, according to the third modification, the lane marking in the road image is extracted even when it is determined that the bent shape of the road varies within the range of the error of the route position (S177: yes).

After that, it is determined whether the lane marking in the road image can be extracted (S182). When the lane marking can be extracted (S182: yes), the offset position of the subject vehicle 1 to the lane marking is detected (S183). The traveling position of the subject vehicle 1 including the position in the width direction of the road is decided (S184). The traveling track of the subject vehicle 1 on the road is generated by using the decided traveling position (S187).

By contrast, when the lane marking cannot be extracted from the road image (S182: no), the movement distance and the movement direction of the subject vehicle 1 are acquired (S185). The route position of the subject vehicle 1 including the position in the width direction on the road is estimated (S186). The traveling track of the subject vehicle 1 on the road is generated by using the estimated traveling position (S187).

After that, the new traveling position decided or estimated as above and the reliability of the traveling position set in S178 or S179 are outputted to the driving assist apparatus 200 (S188). In this case, the traveling lane may be decided from the traveling position and the traveling lane may be outputted.

After that, it is determined whether the driving ends (S189). When the driving does not end (S189: no), the process returns to the start of the traveling position detection process, and the continuous series of the process described above starts after the outputs of the vehicle speed sensor and the azimuth sensor are acquired again (S171 in FIG. 21).

By contrast, when the driving ends (S189: yes), the traveling position detection process of the third modification ends.

In the traveling position detection process of the third modification explained above, it may be possible to output the information showing that the reliability of the traveling position decreases to the driving assist apparatus 200 with the traveling position of the subject vehicle 1 when the bent shape of the road varies within the range of the error of the route position. Therefore, the driving assist apparatus 200 may be possible to provide the appropriate driving assist by changing a method using the information of the traveling position of the subject vehicle 1 corresponding to the reliability.

C-4. Fourth Modification

In the second modification and the third modification described above, it is explained that the traveling position is estimated based on the movement distance and the movement direction of the subject vehicle 1 without using the information of the lane marking extracted from the road image when the bent shape of the road varies within the range of the error of the route position.

However, as shown in the explanation by using FIG. 15, an event occurs, being that the accuracy of the route position is caused to decrease by deciding the traveling position of the subject vehicle 1 by using the information of the lane marking extracted from the road image. In a condition that the event occurs, it is understood that the shift between a steering angle of the subject vehicle 1 shown by the decided traveling position and an actual steering position occurs. For example, in the example shown in FIG. 15, in spite of that the subject vehicle 1 actually goes straight, it is regarded that the subject vehicle 1 turns left according to the traveling position decided by using the information of the lane marking. Adversely, it may occur that the subject vehicle 1 goes straight in the traveling position decided by using the information of the lane marking in spite of that the subject vehicle 1 actually turns left. In the condition, it is considered that the event decreasing the accuracy of the route position occurs by deciding the traveling position of the subject vehicle 1 with use of the information of the lane marking.

It is supposed that the difference between the steering angle of the subject vehicle 1 estimated from the traveling position and the actual steering angle of the subject vehicle 1 becomes larger than the predetermined threshold. In this case, the traveling position may be estimated based on the information of the movement distance and the movement direction of the subject vehicle 1, instead of determining the traveling position by using the information of the lane marking extracted from the road image.

Figure 23:
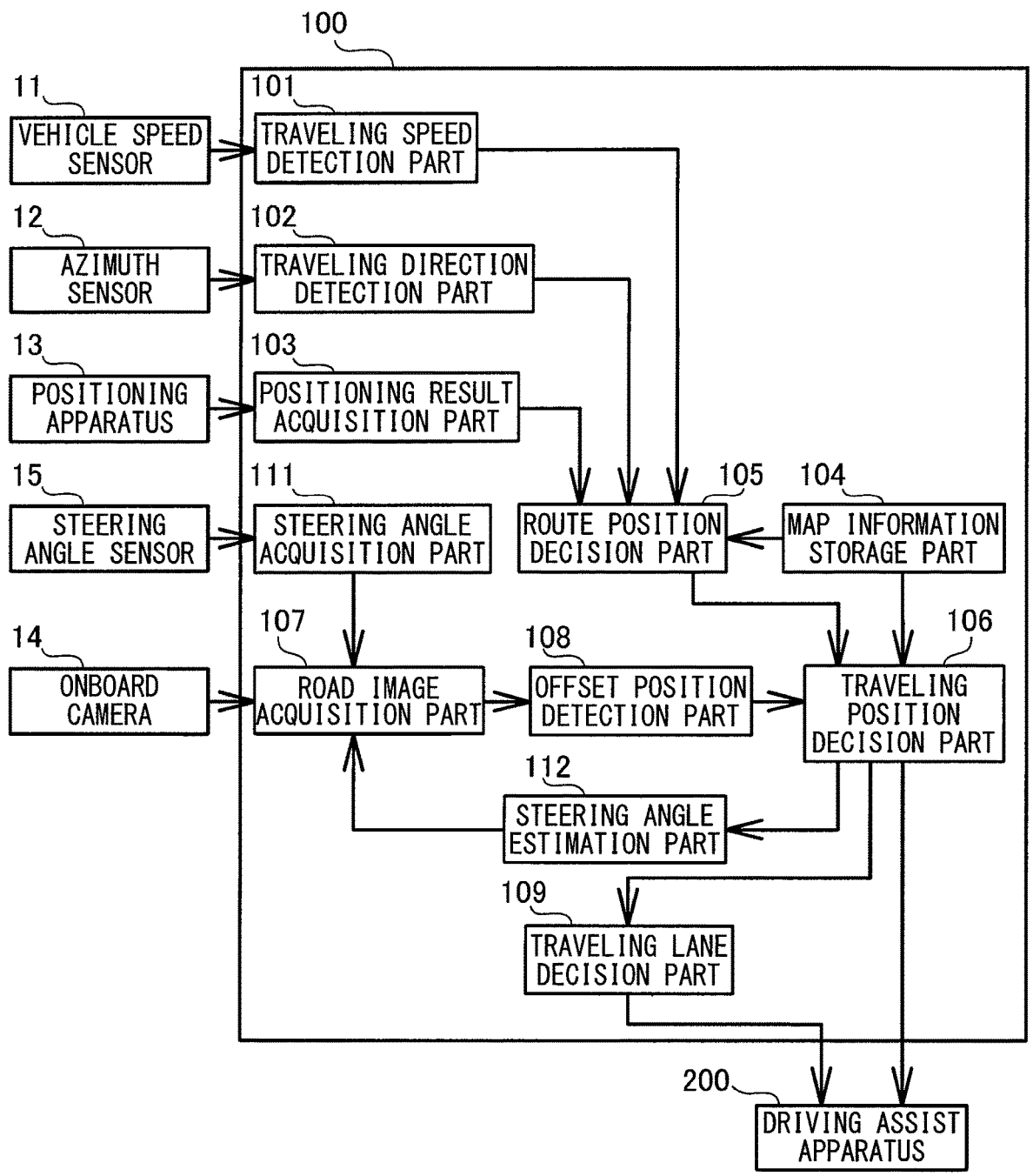
FIG. 23 is a block diagram showing a schematic internal structure of the traveling position detection apparatus of a fourth modification.

FIG. 23 shows a schematic internal structure of the traveling position detection apparatus 100 of the fourth modification. The traveling position detection apparatus 100 of the fourth modification shown in the drawing is largely different from the traveling position detection apparatus 100 of the embodiment described above by using FIG. 2 at a point, the point including a steering angle acquisition part 111 and a steering angle estimation part 112. Hereinafter, the traveling position detection apparatus 100 of the fourth modification will be simply explained with focusing on a different point from the embodiment. At a time of the explanation, the explanation of a similar content with the traveling position detection apparatus 100 of the embodiment will be omitted by applying an identical reference number with the embodiment.

As shown in FIG. 23, the steering angle acquisition part 111 and the steering angle estimation part 112 are installed in the traveling position detection apparatus 100 of the fourth modification.

The steering angle acquisition part 111 is connected to a steering angle sensor 15 installed in a steering handle of the subject vehicle 1 not shown in the drawing. The steering angle acquisition part 111 acquires the actual steering angle of the subject vehicle 1 based on the output from the steering angle sensor 15. The acquired steering angle is outputted to the road image acquisition part 107.

The steering angle estimation part 112 estimates the steering angle of the subject vehicle 1 based on the traveling position decided by the traveling position decision part 106. That is, it may be possible to estimate the steering angle of the subject vehicle 1 by finding the traveling track of the subject vehicle 1 from the traveling position and finding the curve rate of the traveling track. The estimated steering angle is outputted to the road image acquisition part 107.

The road image acquisition part 107 of the fourth modification also acquires the road image from the onboard camera 14, similarly to the embodiment described above by using FIG. 2. The road image acquisition part 107 of the fourth modification compares the steering angle acquired from the steering angle acquisition part 111 with the steering angle acquired from the steering angle estimation part 112 before acquiring the road image. The road image is acquired and outputted to the offset position detection part 108 when a difference of the both is lower than the predetermined threshold value.

By contrast, the road image is not acquired when the difference of the both is larger than the predetermined threshold. Thus, the road image is not outputted to the offset position detection part 108 and the offset position of the subject vehicle 1 to the lane marking is not detected by the offset position detection part 108.

The traveling position detection apparatus 100 of the fourth modification estimates the traveling position based on the information of the movement distance and the movement direction of the subject vehicle 1 instead of deciding the traveling position by using the information of the lane marking extracted from the road image, when the difference between the steering angle of the subject vehicle 1 estimated from the traveling position and the actual steering angle of the subject vehicle 1 becomes larger than the predetermined threshold.

Therefore, it may be possible to avoid the situation deteriorating the accuracy of the route position by deciding the traveling position of the subject vehicle 1 with use of the information of the lane marking extracted from the road image.

In the fourth modification described above, the actual steering angle of the subject vehicle 1 may be calculated based on the traveling direction of the subject vehicle 1 obtained from the output of the azimuth sensor 12 though it is explained that the actual steering angle of the subject vehicle 1 is acquired by using the steering angle sensor 15.

Thereby, it may be possible to fabricate the traveling position detection apparatus 100 of the fourth modification without newly inputting the data of the steering angle sensor 15 to the traveling position detection apparatus 100 of the embodiment.

Though the embodiment and the modification are exemplified, the embodiment and the modification are not limited to this. A technical thought of the present disclosure can be embodied as the various embodiments in the scope of the present disclosure.

What is claimed is:

1. A traveling position detection apparatus that detects a traveling position where a subject vehicle travels on a road including a plurality of traveling lanes divided by a lane marking, the traveling position detection apparatus comprising:

a traveling speed detection part that detects a traveling speed of the subject vehicle based on an output of a vehicle speed sensor installed in the subject vehicle;

a traveling direction detection part that detects a traveling direction of the subject vehicle based on an output of an azimuth sensor installed in the subject vehicle;

a positioning result acquisition part that acquires from a positioning apparatus, a positioning result that is calculated by reception of a positioning signal with the positioning apparatus installed in the subject vehicle;

a map information storage part that stores map information including route information showing a route of the road on a map and lane marking information being information on the lane marking drawn on the road;

a route position decision part that decides a route position that is a position on the route of the road based on the traveling speed, the traveling direction, and the positioning result;

a road image acquisition part that acquires a road image showing the road on which the subject vehicle travels;

an offset position detection part that detects an offset position of the subject vehicle with respect to the lane marking by analyzing the road image to extract the lane marking; and a traveling position decision part that decides the traveling position on the road based on the route position, the offset position and the lane marking information, wherein:

the traveling position decision part estimates the traveling position of the subject vehicle including the offset position to the marking lane by estimating the traveling position based on the traveling speed, the traveling direction, and the traveling position that has already been decided, when the offset position is not detected;

the map information storage part stores, as the lane marking information, information on a kind of the lane marking;

the offset position detection part detects the kind of the lane marking when extracting the lane marking from the road image and detecting the offset position; and the traveling position detection apparatus further comprises a traveling lane identification part that decides a traveling lane where the subject vehicle travels by collating the kind of the lane marking stored as the lane marking information with the kind of the lane marking detected from the road image;

the offset position includes a distance from the lane marking in a left end of the road and a center of the subject vehicle and a distance from the lane marking in a right end of the road and the center of the subject vehicle;

the road includes three lanes on each side and the subject vehicle travels on a center lane as a traveling lane;

the distance from the lane marking in the left end of the road and the center of the subject vehicle is calculated by adding a lane width (Ra) of a left end lane and a distance (L1) from the center of the subject vehicle and a left side lane marking of the traveling lane of the subject vehicle; and the distance from the lane marking in the right end of the road and the center of the subject vehicle is calculated by adding a lane width (Rc) of a right end lane and a distance (L2) from the center of the subject vehicle and a right side lane marking of the traveling lane of the subject vehicle.

2. The traveling position detection apparatus according to claim 1, comprising:

a traveling lane decision part that decides a traveling lane where the subject vehicle travels based on the traveling position.

3. The traveling position detection apparatus according to claim 1, wherein:

the road image acquisition part acquires the road image obtained by photographing toward the traveling direction of the subject vehicle.

4. The traveling position detection apparatus according to claim 1, wherein:

the road image acquisition part acquires the road image showing the road in a left side of the subject vehicle and the road image showing the road in a right side of the subject vehicle; and the offset position detection part analyzes the road image in the left side and the road image in the right side, extracts the lane marking, and detects the offset position.

5. A traveling position detection method detecting a traveling position where a subject vehicle travels on a road including a plurality of traveling lanes divided by a lane marking, the traveling position detection method comprising:

a step that detects a traveling speed of the subject vehicle based on an output of a vehicle speed sensor installed in the subject vehicle and detects a traveling direction of the subject vehicle based on an output of an azimuth sensor installed in the subject vehicle;

a step that acquires from a positioning apparatus, a positioning result calculated by reception of a positioning signal with the positioning apparatus installed in the subject vehicle;

a step that reads out, from a map information storage part, map information including route information showing a route of the road on a map and lane marking information with respect to the lane marking drawn on the road, the map information storage part storing, as the lane marking information, information on a kind of the lane marking;

a step that decides a route position that is a position on the route of the road, based on the traveling speed, the traveling direction and the positioning result;

a step that acquires a road image showing the road on which the subject vehicle travels;

a step that detects an offset position of the subject vehicle to the lane marking by analyzing the road image to extract the lane marking and detects the kind of the lane marking when extracting the lane marking from the road image and detecting the offset position;

a step that decides the traveling position on the road based on the route position, the offset position, and the lane marking information; and a step that decides a traveling lane where the subject vehicle travels by collating the kind of the lane marking stored as the lane marking information with the kind of the lane marking detected from the road image;

wherein:

the step that decides the traveling position estimates the offset position by estimating the traveling position based on the traveling speed, the traveling direction, and the traveling position that has already been decided, when the offset position is not detected;

the offset position includes a distance from the lane marking in a left end of the road and a center of the subject vehicle and a distance from the lane marking in a right end of the road and the center of the subject vehicle;

the road includes three lanes on each side and the subject vehicle travels on a center lane as a traveling lane;

the distance from the lane marking in the left end of the road and the center of the subject vehicle is calculated by adding a lane width (Ra) of a left end lane and a distance (L1) from the center of the subject vehicle and a left side lane marking of the traveling lane of the subject vehicle; and the distance from the lane marking in the right end of the road and the center of the subject vehicle is calculated by adding a lane width (Rc) of a right end lane and a distance (L2) from the center of the subject vehicle and a right side lane marking of the traveling lane of the subject vehicle.

* * * * *